US010851947B2

(12) United States Patent
Gong et al.

(10) Patent No.: US 10,851,947 B2
(45) Date of Patent: Dec. 1, 2020

(54) METHOD AND SYSTEM FOR PIPELINE CONDITION ANALYSIS

(71) Applicant: THE UNIVERSITY OF ADELAIDE, Adelaide (AU)

(72) Inventors: Jinzhe Gong, Adelaide (AU); Martin F. Lambert, Adelaide (AU); Angus R. Simpson, Adelaide (AU); Aaron C. Zecchin, Adelaide (AU); Nicole S. Arbon, Adelaide (AU)

(73) Assignee: The University of Adelaide, Adelaide (AU)

( * ) Notice: Subject to any disclaimer, the term of this patent is extended or adjusted under 35 U.S.C. 154(b) by 73 days.

(21) Appl. No.: 15/744,726

(22) PCT Filed: Jul. 15, 2016

(86) PCT No.: PCT/AU2016/000251
§ 371 (c)(1),
(2) Date: Jan. 12, 2018

(87) PCT Pub. No.: WO2017/011850
PCT Pub. Date: Jan. 26, 2017

(65) Prior Publication Data
US 2018/0356046 A1 Dec. 13, 2018

(30) Foreign Application Priority Data
Jul. 17, 2015 (AU) ................... 2015902846

(51) Int. Cl.
*G01M 3/24* (2006.01)
*G01M 3/28* (2006.01)
(Continued)

(52) U.S. Cl.
CPC ............... *F17D 5/06* (2013.01); *G01M 3/243* (2013.01); *G01M 3/2815* (2013.01);
(Continued)

(58) Field of Classification Search
CPC ........... F17D 5/06; G01M 3/24; G01M 3/243; G01M 3/28; G01M 3/2815; G01M 5/0033; G01M 5/0066; G01N 29/00; G01N 29/04
See application file for complete search history.

(56) References Cited

U.S. PATENT DOCUMENTS 3,903,729 A 9/1975 Covington
7,266,992 B2 * 9/2007 Shamout ............... G01M 3/243
73/40.5 A
(Continued)

FOREIGN PATENT DOCUMENTS

GB 2335279 A 9/1999
JP 61294326 A 10/1994
(Continued)

OTHER PUBLICATIONS

International Search Report dated Sep. 12, 2016, issued in corresponding International Application No. PCT/AU2016/000251, filed Jul. 15, 2016, 4 pages.
(Continued)

*Primary Examiner* — Nguyen Q. Ha
(74) *Attorney, Agent, or Firm* — Christensen O'Connor Johnson Kindness PLLC

(57) ABSTRACT

A method and system for assessing the condition of a pipeline in a pipeline system is disclosed. The method includes generating a pressure wave in the fluid being carried along the pipeline system at a generation location along the pipeline system, detecting a first pressure wave interaction signal at a first measurement location along the pipeline system resulting from an interaction of the pressure wave with localised variations in the pipeline and then detecting synchronously a second pressure wave interaction signal at a second measurement location along the pipeline system resulting from the interaction of the pressure wave
(Continued)

with localised variations in the pipeline. The method then involves comparing the first and second pressure wave interaction signals to determine a location of individual features in the first and second pressure wave interaction signals with respect to the generation location, the individual features corresponding to pressure wave reflections from localised variations in the pipeline and characterising the individual features to assess the condition of the pipeline.

24 Claims, 19 Drawing Sheets

(51) Int. Cl.
  *G01N 29/00* (2006.01)
  *F17D 5/06* (2006.01)
  *G01M 5/00* (2006.01)
  *G01N 29/04* (2006.01)
(52) U.S. Cl.
  CPC ........ *G01M 5/0033* (2013.01); *G01M 5/0066* (2013.01); *G01N 29/04* (2013.01)

(56) References Cited

U.S. PATENT DOCUMENTS

| | | | |
|---|---|---|---|
| 2012/0041694 A1 | 2/2012 | Stephens et al. | |
| 2012/0191377 A1* | 7/2012 | Engl | G01N 29/265 702/39 |
| 2016/0252422 A1* | 9/2016 | Howitt | E03B 7/071 73/40.5 A |
| 2020/0103306 A1* | 4/2020 | Mine | G01M 3/243 |

FOREIGN PATENT DOCUMENTS

| | | |
|---|---|---|
| WO | 2009/158602 A1 | 12/2009 |
| WO | 2010/017599 A1 | 2/2010 |
| WO | 2013/002656 A1 | 1/2013 |

OTHER PUBLICATIONS

International Preliminary Report on Patentability and Written Opinion of the International Searching Authority dated Jan. 23, 2018, issued in corresponding International Application No. PCT/AU2016/000251, filed Jul. 15, 2016, 7 pages.
Gong, J., et al., "Distributed deterioration detection in single pipelines using transient measurements from pressure transducer pairs," Proceedings of the 11th International Conference on Pressure Surges, BHR Group, Cranfield, UK, pp. 127-140, Jan. 2012.
Gong, J., et al., "Distributed deterioration detection in single pipes using the impulse response function," 14th International Conference on Water Distribution Systems Analysis (WDSA 2012), Adelaide, South Australia, pp. 702-719, Sep. 2012.
Gong, J., et al., "Detection of distributed deterioration in single pipes using transient reflections," Journal of Pipeline Systems Engineering and Practice 4(1):32-40, Feb. 2013.
Gong, J., et al., "Detection of localized deterioration distributed along single pipelines by reconstructive MOC analysis," Journal of Hydraulic Engineering 140(2):190-198, Feb. 2014.
First Office Action dated Jul. 10, 2019, in counterpart Chinese Patent Application No. 201680053725.4 28 pages.
Extended European Search Report dated Feb. 13, 2019, in counterpart European Patent Application No. 16826911.6, 14 pages.
Zecchin, A.C., et al., "Condition Assessment in Hydraulically Noisy Pipeline Systems Using a Pressure Wave Splitting Method," Procedia Engineering, 89:1336-1342, Dec. 2014.
Gong, J., et al., "Signal Separation for Transient Wave Reflections in Single Pipelines Using Inverse Filters," World Environmental and Water Resources Congress 2012, pp. 3275-3284, May 17, 2012.

* cited by examiner

METHOD AND SYSTEM FOR PIPELINE CONDITION ANALYSIS

PRIORITY DOCUMENTS

The present application claims priority from Australian Provisional Patent Application No. 2015902846 titled "METHOD AND SYSTEM FOR PIPELINE CONDITION ANALYSIS" and filed on 17 Jul. 2015, the content of which is hereby incorporated by reference in its entirety.

INCORPORATION BY REFERENCE

The following publications are referred to in the present application and their contents are hereby incorporated by reference in their entirety:

International Patent Application No. PCT/AU2009/001051 (WO/2010/017599) titled "METHOD AND SYSTEM FOR ASSESSMENT OF PIPELINE CONDITION" in the name of Adelaide Research & Innovation Pty Ltd;

Gong J, Simpson A R, Lambert M F, et al., "Detection of distributed deterioration in single pipes using transient reflections", *J Pipeline Syst Eng Pract*, 2013; 4: 32-40; and Gong J, Lambert M F, Simpson A R and Zecchin A C. "Distributed deterioration detection in single pipes using the impulse response function", 14*th International Conference on Water Distribution Systems Analysis* (WDSA 2012) Adelaide, South Australia: Engineers Australia, 2012; 702-719.

TECHNICAL FIELD

The present disclosure relates to assessing the condition of a pipeline system. In a particular form, the present disclosure relates to assessing a section of pipeline employing pressure waves generated in the fluid carried by the pipeline system.

BACKGROUND

Water transmission and distribution pipelines are critical infrastructure for modern cities. Due to the sheer size of the networks and the fact that most pipelines are buried under ground, the health monitoring and maintenance of this infrastructure is challenging. Similarly, pipes and pipeline systems may be used to convey any number of types of fluid ranging from petroleum products to natural gas. Although a number of techniques have been developed for pipeline condition assessment, including visual inspection (eg, closed-circuit television (CCTV) inspection), electromagnetic methods (eg, magnetic flux leakage method and ground penetrating radar), acoustic methods and ultrasonic methods (eg, guided wave ultrasound inspection), they are in many circumstances invasive, too costly and/or inefficient for large networks.

One technique that has been adopted for the non-invasive assessment of pipeline system condition is the use of pressure wave or fluid transients such as water hammer waves. Fluid transients are pressure waves that propagate in the fluid and along a pipeline. One example pressure wave used for detecting faults in a pipeline system is a step pressure wave generated by abruptly closing a side-discharge valve after a steady-state flow condition has been established. A physical change in the pipe wall, such as a leak or wall thinning due to corrosion can then introduce a pressure wave reflection from the original pressure wave interacting with the physical change in the pipeline system. The reflected wave then propagates towards the source of the initial pressure wave (eg, the side-discharge valve) where it can be measured by pressure transducers installed on existing accessible points on the pipeline system such as air valves or fire hydrant access points. The arrival time of the wave reflection may then in theory be used to determine the location of the defect with the magnitude of the reflection being indicative of the severity of the physical changes causing the reflection.

In our earlier PCT Patent Application No. PCT/AU2009/001051 (WO/2010/017599) titled "METHOD AND SYSTEM FOR ASSESSMENT OF PIPELINE CONDITION", the Applicant here disclosed a method and system for determining the location and extent of multiple variations in pipeline condition based on an inverse transient analysis (ITA) which adopted an iterative approach to determine a full condition assessment of a pipeline based on optimisation techniques. While this approach has been very successful, it can become extremely computationally intensive for complex pipeline systems. In the case where a highly detailed condition assessment is not required, and also where there may be some prior knowledge as to extant defects in the pipeline, there is a need for an alternative approach that is not so computationally intensive.

SUMMARY

In a first aspect, the present disclosure provides a method for assessing the condition of a pipeline in a pipeline system, including:
   generating a pressure wave in the fluid being carried along the pipeline system at a generation location along the pipeline system;
   detecting a first pressure wave interaction signal at a first measurement location along the pipeline system resulting from an interaction of the pressure wave with localised variations in the pipeline;
   detecting synchronously a second pressure wave interaction signal at a second measurement location along the pipeline system resulting from the interaction of the pressure wave with localised variations in the pipeline;
   comparing the first and second pressure wave interaction signals to determine a location of individual features in the first and second pressure wave interaction signals with respect to the generation location, the individual features corresponding to pressure wave reflections from localised variations in the pipeline; and
   characterising the individual features to assess the condition of the pipeline.

In another form, comparing the first and second pressure wave interaction signals includes comparing by time-shifting the first and/or second pressure wave interaction signals to determine the location of individual features.

In another form, comparing by time-shifting the first and/or second pressure wave interaction signals to determine the location of individual includes determining which side of the generation location the localised variations are located.

In another form, determining which side of the generation location the localised variations are located includes:
   selecting a measurement location to be a reference measurement location, the reference measurement location not located at the generation location;
   for each remaining measurement location determining whether each remaining measurement location is located:
      on the same side of the generation location as the reference measurement location;

on the opposite side of the generation location compared to the reference measurement location; or at the generation location;

applying a negative time shift (backward in time) to the respective pressure wave interaction signal for those measurement locations located on the same side of the generation location as the reference measurement location, the negative time shift corresponding to the time interval that the pressure wave takes to travel from the generation location to the respective measurement location;

applying a positive time shift (forward in time) to the respective pressure wave interaction signal for those measurement locations located on the other side of the generation location compared to the reference measurement location, the positive shift corresponding to the time interval that the pressure wave takes to travel from the generation location to the respective oppositely located measurement location;

applying no time shift to the respective pressure wave interaction signal for those measurement locations located at the generation location; and identifying common features in the time shifted pressure wave interaction signals, the common features corresponding to a subset of localised variations located on the other side of the generation location compared to the reference measurement location.

In another form, the method includes:

applying a positive time shift to the respective pressure wave interaction signal for those measurement locations located on the same side of the generation location as the reference measurement location, the positive time shift corresponding to the time interval that the pressure wave takes to travel from the generation location to the respective measurement location;

applying a negative time shift to the respective pressure wave interaction signal for those measurement locations located on the other side of the generation location compared to the reference measurement location, the negative shift corresponding to the time interval that the pressure wave takes to travel from the generation location to the respective oppositely located measurement location;

applying no time shift to the respective pressure wave interaction signal for those measurement locations located at the generation location; and identifying common features in the time shifted pressure wave interaction signals, the common features corresponding to a subset of localised variations located on the same side of the generation location compared to the reference measurement location.

In another form, the method includes changing the reference measurement location to a measurement location located on the other side of the generation location.

In another form, the reference measurement location corresponds to a hypothetical measurement location.

In another form, characterising the individual features to assess the condition of the pipeline includes applying threshold criteria to an individual feature in the first and second pressure wave interaction signals corresponding to a pressure wave reflection from a localised variation in the pipeline to determine whether the localised variation is a hydraulic feature and/or component of the pipeline system.

In another form, determining whether the localised variation is a hydraulic feature and/or component of the pipeline system includes classifying the pressure wave reflection as corresponding to a type of hydraulic feature and/or component.

In another form, the type of hydraulic feature includes one or more of:
   a change in pipe material;
   a change in pipe diameter;
   a change in pipe lining;
   a change in pipe wall thickness; or
   a change in pipe class.

In another form, the type of hydraulic component includes one or more of:
   a valve;
   a closed or open branch pipeline section extending from the pipeline;
   an off-take;
   a reservoir; or
   a tank.

In another form, the valve type of hydraulic component includes one or more of the following valve sub-types of:
   an inline valve (partially or fully closed);
   a scour valve;
   a valve on entry to a branch pipeline (partially or fully closed); or
   an air valve.

In another form, determining whether the localised variation is a hydraulic feature and/or component of the pipeline system includes correlating the localised variation with prior information regarding the pipeline system to determine whether the hydraulic feature and/or component is registered or unregistered.

In another form, characterising the individual features to assess the condition of the pipeline includes applying threshold criteria to identify major pressure wave reflections in the first and second pressure wave interaction signals.

In another form, the method includes dividing the pipeline into sub-sections based on the locations of the localised variations responsible for the major pressure wave reflections.

In another form, the method includes determining a characteristic of each sub-section.

In another form, the characteristic is the wave speed for each sub-section.

In another form, the characteristic is the impedance for each sub-section.

In another form, the characteristic is the location and extent of each sub-section.

In another form, the characteristic is the equivalent wall thickness of each sub-section.

In another form, characterising the individual features to assess the condition of the pipeline includes applying threshold criteria to identify significant pressure wave reflections in the first and second pressure wave interaction signals corresponding to localised defects in the pipeline.

In another form, classifying the significant pressure wave reflection as corresponding to a type of localised defect.

In another form, the type of localised defect includes one or more of:
   a short reach in the pipeline with significant wall deterioration;
   a leak;
   a blockage; or
   an air pocket.

In another form, the method includes determining the location of the localised defect in the pipeline.

In a second aspect, the present disclosure provides a system for assessing the condition of a pipeline in a pipeline system, including:

a pressure wave generator for generating a pressure wave in the fluid being carried along the pipeline system at a generation location along the pipeline system;

a first pressure detector for detecting a first pressure wave interaction signal at a first measurement location along the pipeline system resulting from an interaction of the pressure wave with localised variations in the pipeline;

a second pressure detector for detecting synchronously a second pressure wave interaction signal at a second measurement location along the pipeline system resulting from the interaction of the pressure wave with localised variations in the pipeline; and a data processor for:

comparing the first and second pressure wave interaction signals to determine a location of individual features in the first and second pressure wave interaction signals with respect to the generation location, the individual features corresponding to pressure wave reflections from localised variations in the pipeline; and characterising the individual features to assess the condition of the pipeline.

In another form, comparing the first and second pressure wave interaction signals includes comparing by time-shifting the first and/or second pressure wave interaction signals to determine the location of individual features.

In a third aspect, the present disclosure provides a method for assessing the condition of a section of pipeline in a pipeline system, the method including:

generating a first pressure wave in the fluid being carried along the pipeline system, the first pressure wave generated at a location upstream or downstream of the section of pipeline;

detecting a first pressure wave response signal at a first set of one or more measurement locations along the pipeline system;

generating a second pressure wave in the fluid carried along the pipeline system, the second pressure wave generated at a location downstream of the section of pipeline if the first pressure wave was generated upstream or alternatively at a location upstream of the section of pipeline if the first pressure wave was generated downstream;

detecting a second pressure wave response signal at a second set of one or more measurement locations along the pipeline;

comparing by time-shifting the first and second pressure wave response signals measured at the first and second set of measurement locations to identify the source locations and directions of pressure wave reflections measured in the first and second pressure wave response signals;

dividing the section of pipeline into a two or more sub-sections according to a selection of the source locations of the pressure wave reflections; and assessing the condition of each sub-section of the section of pipeline based on a localised characterisation of each sub-section of the section of pipeline.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
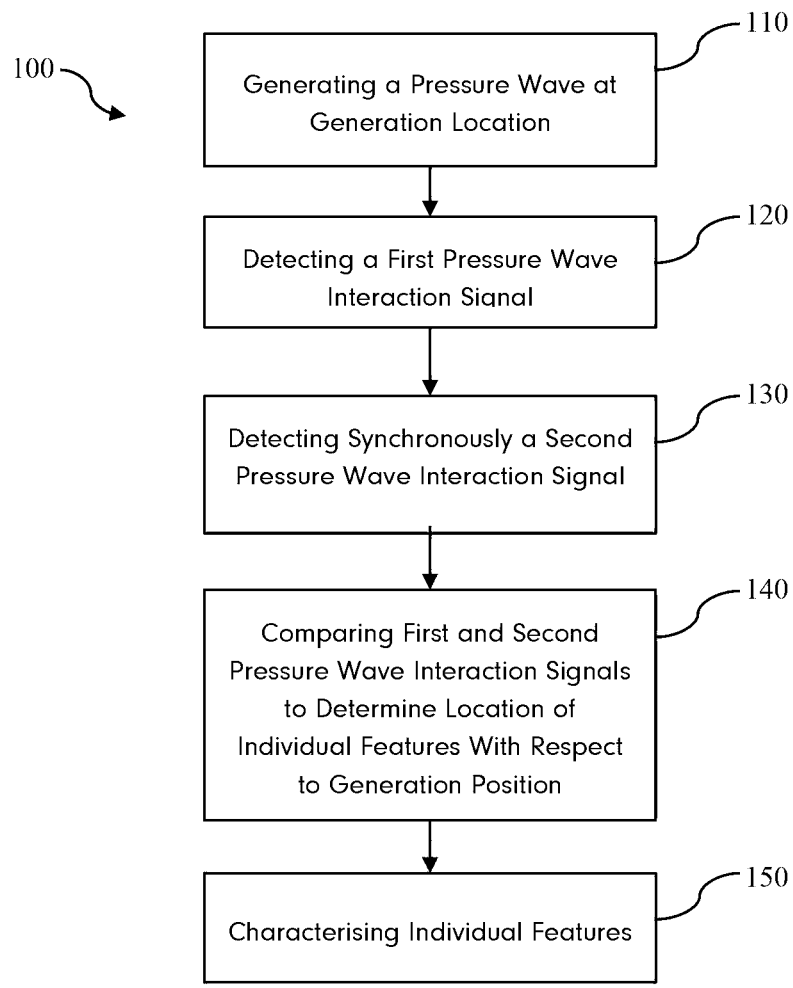
FIG. 1 is a flow chart of a method for assessing the condition of a pipeline in a pipeline system according to an illustrative embodiment.
Figure 2:
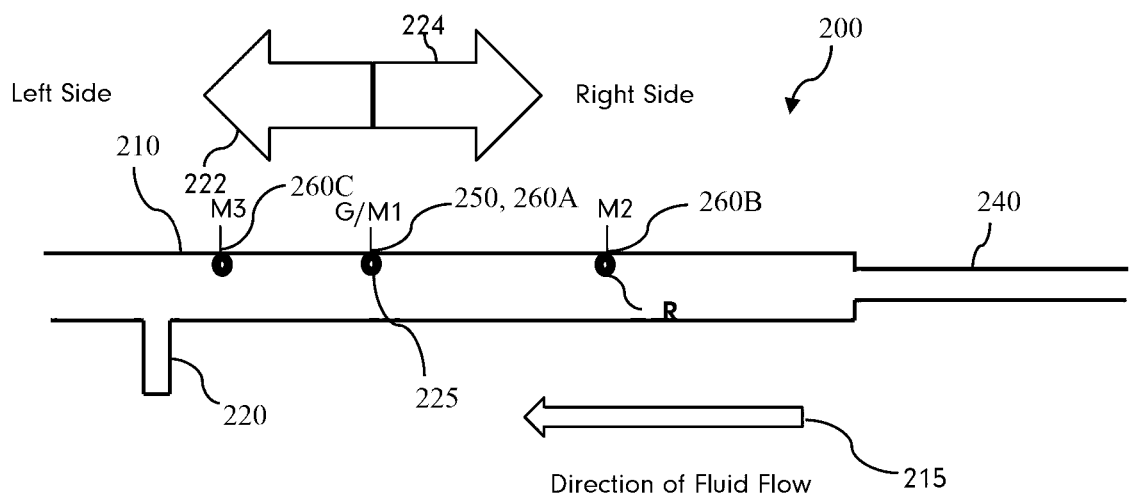
FIG. 2 is an example pipeline system depicting one arrangement of a pressure wave generator and associated measurement location according to an illustrative embodiment.

Referring now to FIG. 1, there is shown the steps 100 in a method for assessing the condition of a pipeline in a pipeline system according to an illustrative embodiment. Referring also to FIG. 2, there is shown an example pipeline system 200 that will assist in the description of the method for assessing a pipeline illustrated in FIG. 1. Pipeline system 200 includes a pipeline 210 consisting of a number of localised variations in pipeline 200 that will cause a pressure wave interaction signal by virtue of any pressure wave reflecting from the localised variation. The first of these example localised variations is the closed short branch 220 extending from pipeline 210. As would be appreciated, these short branches consist of pipeline sections to connect hydraulic components such as valves or fire hydrants. The second localised variation capable of causing a pressure wave interaction signal in the form of a reflection is the reduced diameter section 240 of pipeline system 200. A reduced diameter section may be a designed feature or due to an extended blockage.

At step 110, a pressure wave is generated in the fluid being carried along the pipeline system at a generation location along the pipeline system. As shown in FIG. 2, there is depicted pressure wave generation device G located at generation location 250. In this example, pressure wave generation device also includes a measurement capability M1 to measure the pressure in the pipeline 210 and hence also corresponds to a first measurement location 260A. Pipeline system 200 in this example also includes an additional pressure measurement location M2 at second measurement location 260B where there is located a dedicated pressure measurement device as well as further pressure measurement location M3 located at third measurement location 260C. In this example pipeline system 200, the additional pressure measurement locations M2 and M3 are located either side of the generation location 250.

In one illustrative embodiment, pressure wave generator G is a customised discharge valve connected to an existing access point 225 (such as an air valve or scour valve) of the pipeline system 210. A controlled step pressure wave (typically 5-10 m in magnitude) may be induced by first opening the discharge valve releasing a flow until steady-state conditions (or close to steady-state conditions), are reached. As an example, for pipes ranging from 600 to 1000 mm in diameter, the amount of discharge will typically range between 20-40 L/s for steady-state flow. Once the steady-state flow has been achieved, the discharge valve is then rapidly closed, typically within 10 ms. This has the effect of progressively halting the flow of fluid along the pipe that had been established as a result of the previously open discharge valve. The generated pressure wave then propagates along the pipeline 210 in both left 222 and right 224 directions from pressure wave generator G. Other means to generate a pressure wave include, but are not limited to, inline valve closure devices and piston chambers which draw an amount of fluid into a chamber containing a piston which is then operated.

At step 120, a first pressure wave interaction signal is detected at first measurement location 260A along the pipeline system 200 by combined pressure generation and measurement device G/M1 resulting from an interaction of the pressure wave with localised variations in the pipeline 210. A pressure measurement device typically includes a pressure transducer and a corresponding data acquisition system, generally consisting of an amplifier, an analogue to digital (A/D) convertor and a computer.

At step 130, a second pressure wave interaction signal is detected at the same time or synchronously at the second measurement location 260B along the pipeline system 200 resulting from the interaction of the pressure wave with localised variations in the pipeline. As would be appreciated, the present method is not to be limited to two measurement locations and so in this example a third pressure wave interaction signal is also detected at third measurement location 260C again at the same time or synchronously with the detection at the first measurement location. In the example where pressure wave generator G does not also include pressure measurement capability, the second measurement location could correspond to measurement location 260C.

At step 140, the first and second pressure wave interaction signals that have been measured on the same time basis are compared to determine a location of individual features in the first and second pressure wave interaction signals with respect to the generation location G where the individual features correspond to pressure wave reflections originating from the localised variations in the pipeline.

Figure 3:
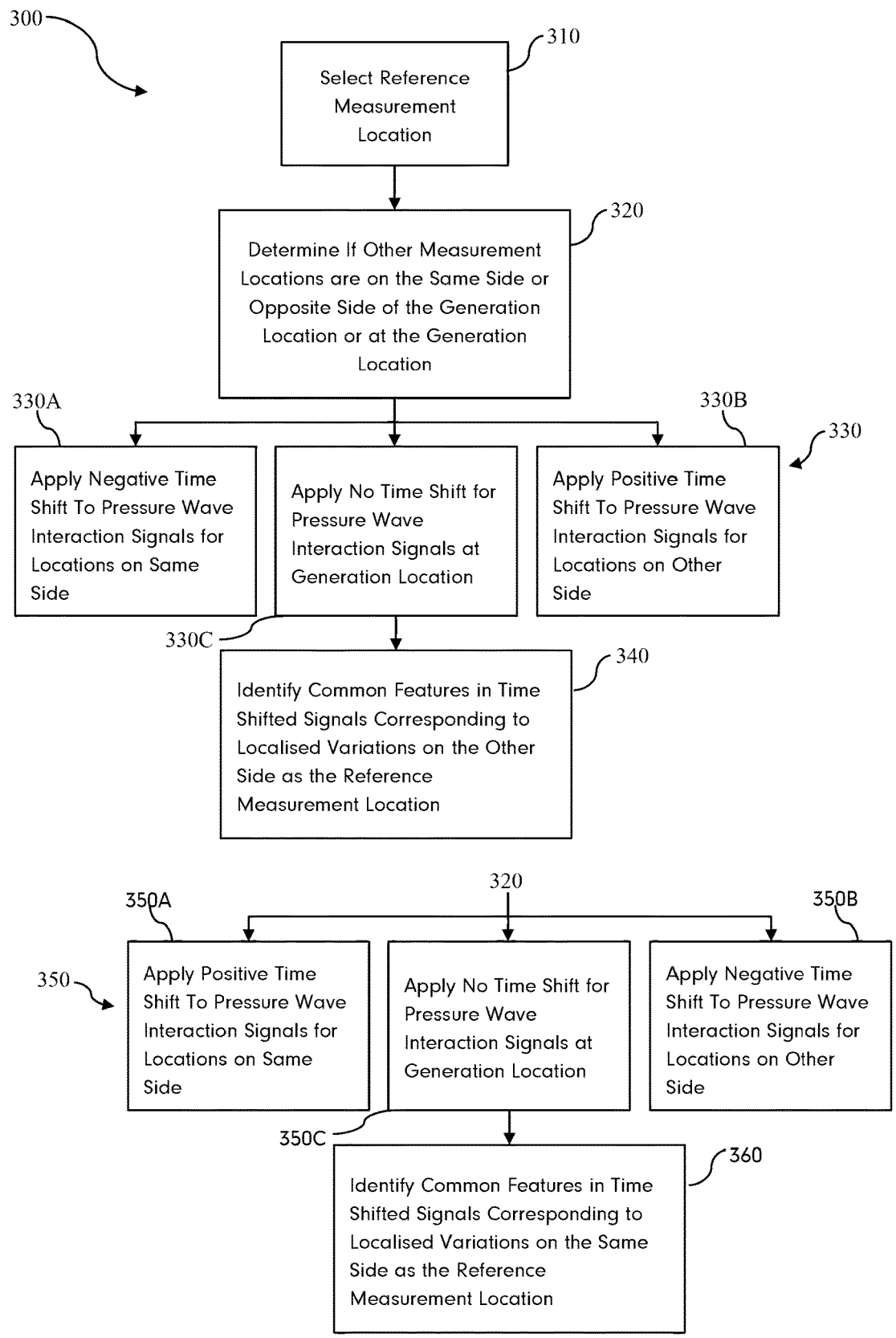
FIG. 3 is a flow chart of a method for determining the location of individual features in the pressure wave interaction signals with respect to the generation location according to an illustrative embodiment.

In one illustrative embodiment, this step includes comparing by time-shifting the first and/or second pressure wave interaction signals as will be described below and first determining which side of the generation location the localised variations are located where one example of such a method 300 is illustrated in FIG. 3. Method 300 will be described with reference to FIGS. 4a, 4b and 4c.

The question of determining which side of the generation location necessarily carries with it the definition of "side". Terminology such as left hand 222 or right hand 224 side assumes a particular orientation of the observer. Similarly, one could use terminology of being downstream (corresponding to the left side 222) or upstream (corresponding to the right side 224) of the generation location 250 as depicted in FIG. 2 but this relies on separately defining the direction of fluid flow 215 in any pipeline system that is being characterised. In the present method, location with respect to the generation location is defined with respect to a reference measurement location. In this manner, other measurement locations necessarily fall into one of three categories of either being on the same side of the generation location as the reference measurement location, or on the other side of the generation location or finally located at the generation location as is the case of G/M1 depicted in FIG. 2.

Accordingly, the first step in method 300 at 310 is to select a measurement location to be the reference location ensuring that reference measurement location does not itself correspond to the generation location. In one example, reference location M2 is chosen as the reference measurement location as indicated by R in FIG. 2.

Figure 4A:
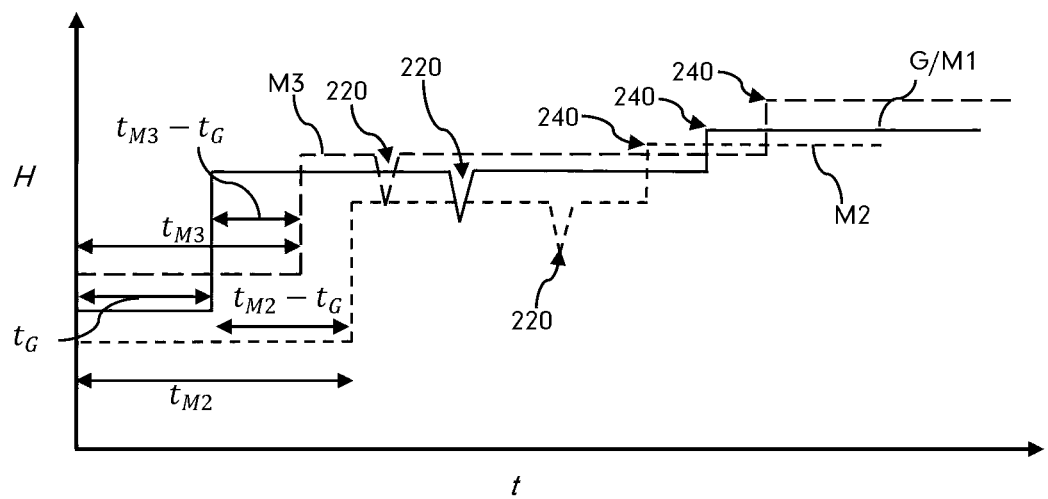
FIG. 4a is a plot of the pressure wave interaction signals detected for the example pipeline system illustrated in FIG. 2.

Referring now to FIG. 4a, there is a plot of the first and second pressure wave interaction signals (H), ie, pressure head, as a function of time detected at G/M1 and M2 of the pipeline system 200 illustrated in FIG. 2 illustrating how both of these pressure wave interaction signals have been detected at the same time or on the same time basis. Individual features in the pressure wave interaction signals corresponding to closed short branch 220 and reduced diameter section 240 are indicated in each pressure wave interaction signal corresponding to G/M1 and M2 respectively. In addition, the pressure wave interaction signal for M3 is also shown.

The time $t_G$ corresponds to the time that the pressure wave was generated at G/M1 is indicated in FIG. 4a. The first arrival time at M2 of the pressure wave originating from G/M1 is denoted $t_{M2}$ as indicated. The time that it takes the pressure wave to reach M2 from G is then $t_{M2}-t_G$ as indicated on FIG. 4a. Similarly, the first arrival time at M3 of the pressure wave originating from G/M1 is denoted $t_{M3}$ as indicated with the time that it takes the pressure wave to reach M3 from G is then $t_{M3}-t_G$ as also indicated on FIG. 4a Considering the pressure wave response signal measured by G/M1, it can be seen by inspection that the pressure wave reflection from closed short branch 220 would arrive earlier at G/M1 than at M2 and even earlier at M3. Similarly, the pressure wave reflection from reduced diameter section 240 would be expected to arrive at M2 earlier than it would arrive at G/M1 and finally at M3. In order to identify reflection features based on both the pressure wave interaction signals recorded at G/M1, M2 and M3, appropriate time shifting of the pressure wave interaction signals is carried out.

At step 320, a determination is made whether the remaining measurement locations are located on the same side of the generation location as the reference measurement location, on the opposite side of the generation location compared to the reference measurement location or at the generation location. In the example configuration in FIG. 3, and for a reference measurement location located at M2, M3 is located on the opposite side of the generation location and G/M1 is located at the generation location.

Figure 4B:
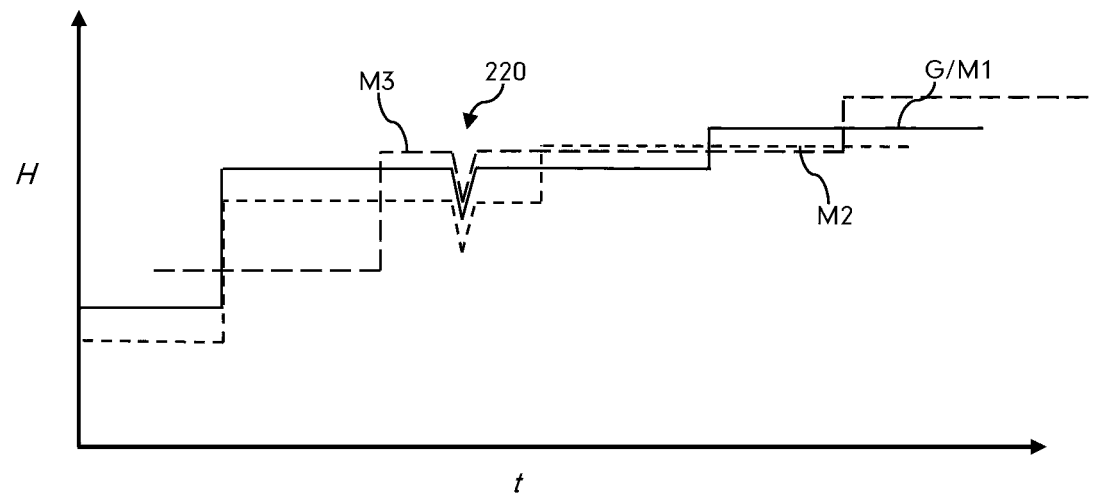
FIG. 4b is a plot of the time shifted pressure wave interaction signals illustrated in FIG. 4a to determine the location of individual features corresponding to reflections from the left hand side of the generator as depicted.

With reference to FIG. 4b, at step 330 each of the pressure wave interaction signals have a time shift applied in accordance with the following criteria in order to identify localised variations in pipeline 210 located on the other side of the generation location from the reference measurement location, i.e. to the left hand side 222 or downstream side of generation location G/M1.

For those measurement locations on the same side of the generation location G/M1 as the reference measurement location M2 a negative time shift 330A to the respective pressure wave interaction signal is applied corresponding to the time interval that the pressure wave takes to travel from the generation location to that measurement location. A negative time shift means to shift the respective pressure wave backward in time (ie, shift to an earlier time). In the FIG. 2 configuration, M2 is the only measurement location meeting this criterion and so has a negative time shift applied. For those measurement locations located on the other side of the generation location a positive time shift 330B is applied corresponding to the time interval that the pressure wave takes to travel from the generation location to that measurement location. A positive time shift means to shift the respective pressure wave forward in time (ie, shift to a later time). In this case, M3 meets this criterion.

For those measurement locations located at the generation location such as G/M1 no time shift 330C is applied.

At step 340, common features are then identified in the time shifted pressure wave interaction signals. As shown in FIG. 4b, the common feature is the reflection anomaly arising from the localised variation in the form of closed short branch 220 which correlates across each of the three pressure wave interaction signals and arising from pressure wave reflections moving from left to right as depicted in FIG. 2. In this manner, the location of the closed short branch 220 is determined to be on the other side of the generation location G/M1 from M2.

Figure 4C:
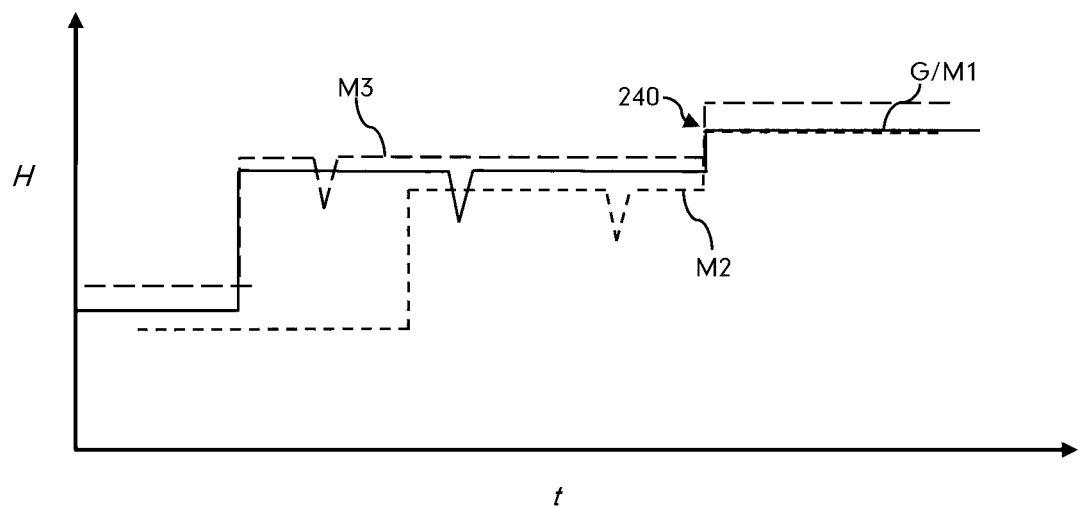
FIG. 4c is a plot time of the shifted pressure wave interaction signals illustrated in FIG. 4a to determine the location of individual features corresponding to reflections from the right hand side of the generator as depicted.

Referring now to FIG. 4c, a similar process is adopted to identify localised variation in pipeline 210 located on the same side of the generation location G/M1 as the reference measurement location M2. This is shown in steps 350 and 360 of method 300 illustrated in FIG. 3. At step 350A a positive time shift is applied to pressure wave interaction signals from measurement locations on the same side as the reference measurement location while at step 350B a negative time shift is applied to pressure wave interaction signals from measurement locations on the opposite side of generation location while no time shift 350C is applied to any measurement location located at the generation location.

At step 360, common features are then identified in the time shifted pressure wave interaction signals. As shown in FIG. 4c, the common feature is the reflection anomaly arising from the localised variation in the form of the reduced diameter section 240 which correlates across each of the three pressure wave interaction signals and arising from pressure wave reflections moving from right to left as depicted in FIG. 2. In this manner, the location of the closed short branch 240 is determined to be on the same side of the generation location G/M1 as M2.

In another embodiment, the identification of localised variations on the right hand 224 or upstream side could be achieved by selecting a reference measurement location on the left hand 222 or downstream side of the G/M1 and repeating steps 310 to 340 as described above.

As would be appreciated, to simplify the analysis the pressure wave interaction signals may be first baselined or shifted so that the time at which the pressure wave is generated is set to be zero, ie $t=t-t_G$. As would be further appreciated, while at least two pressure wave interaction signals corresponding to different measurement locations are required, the present method may be applied to multiple measurement locations as required. Further measurement statistics may be improved by taking multiple measurements for each location.

In this manner, data from multiple stations each measuring respective pressure wave interactions signals may be combined to assist in identifying the existence and location of localised variations in the pipeline that cause a pressure wave reflection feature and as a corollary the direction of the pressure wave reflection originating from these localised variations with respect to the pressure wave generator.

Figure 5:
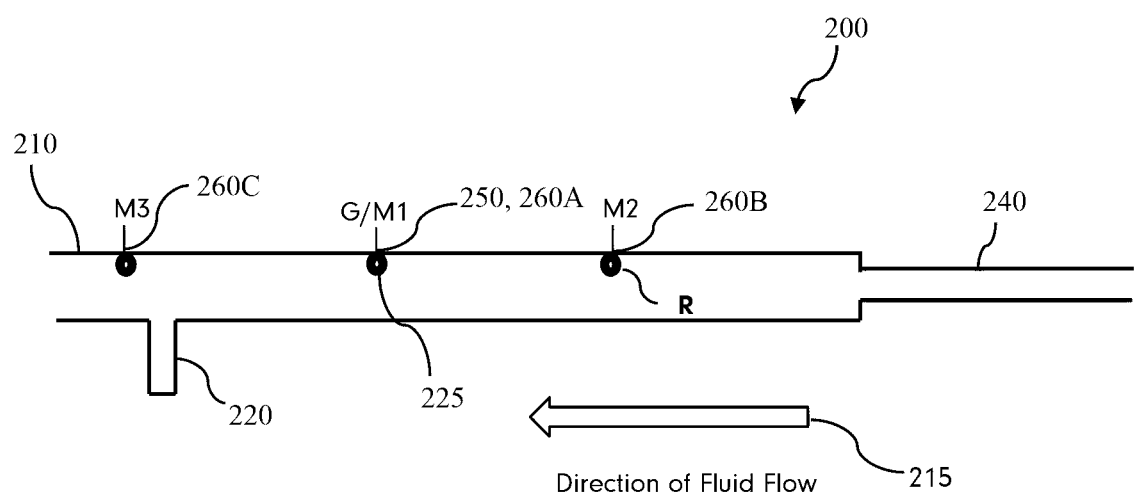
FIG. 5 is an example pipeline system depicting an alternative arrangement of a pressure wave generator and associated measurement locations according to an illustrative embodiment.
Figure 6A:
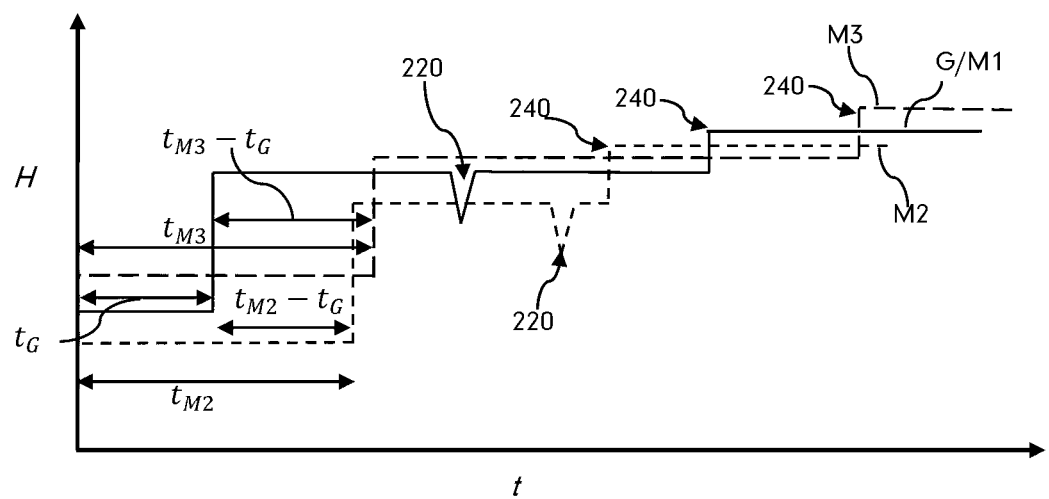
FIG. 6a is a plot of the pressure wave interaction signals detected for the example pipeline system illustrated in FIG. 5.
Figure 6B:
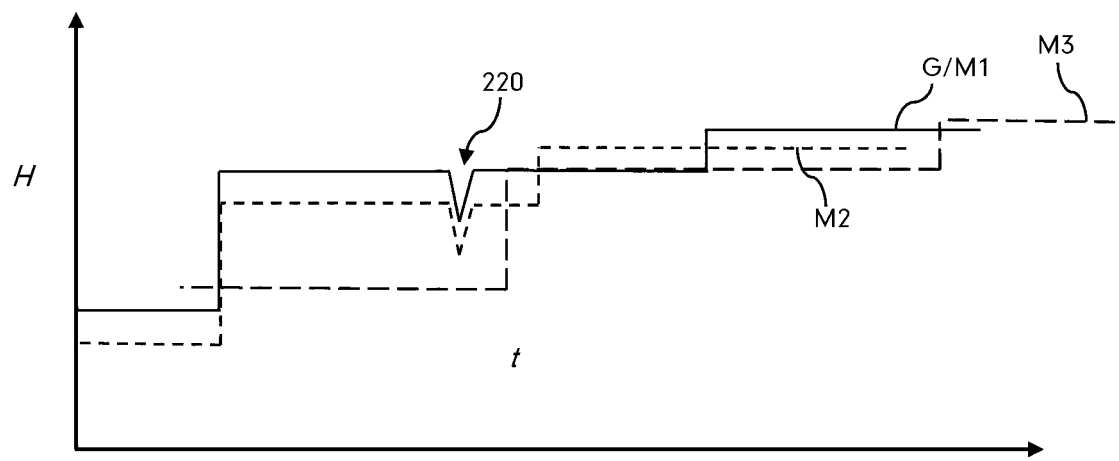
FIG. 6b is a plot of the time shifted pressure wave interaction signals illustrated in FIG. 6a to determine the location of individual features corresponding to reflections from the left hand side of the generator as depicted.
Figure 6C:
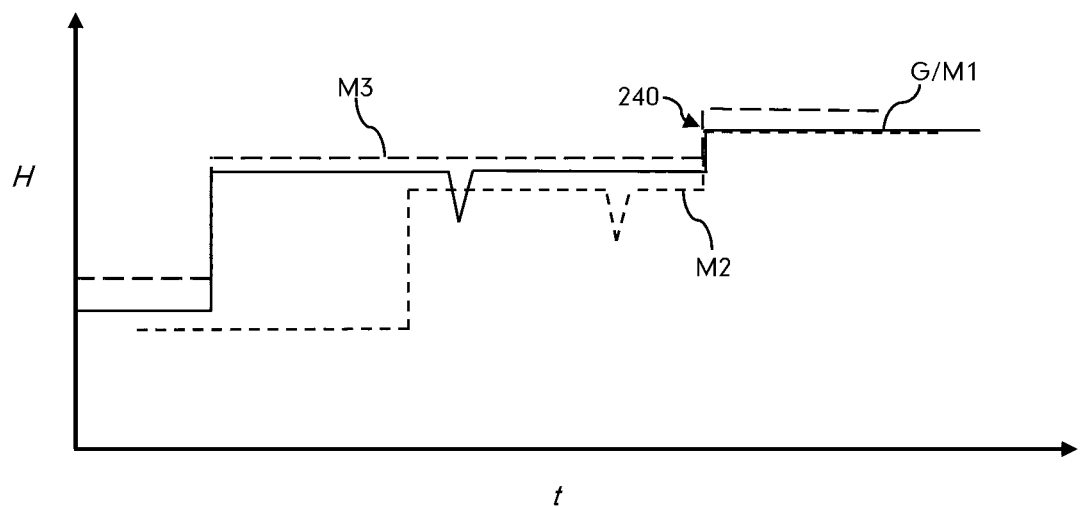
FIG. 6c is a plot of the time the shifted pressure wave interaction signals illustrated in FIG. 6a to determine the location of individual features corresponding to reflections from the right hand side of the generator as depicted.

Referring now to FIG. 5, there is shown pipeline system 200 with another configuration of generation and measurement locations. Compared to FIG. 2, the configuration shown in FIG. 5 involves measurement location transferred a short distance downstream of (or to the left of) short branch 220. FIG. 6a depicts the pressure interaction signal measured at each measurement location. In this example, the pressure interaction signal measured at M3 does not include a pressure wave reflection corresponding to closed short branch 220 as this localised variation is closer to G/M1 than M3 (ie, in between G/M1 and M3) as depicted on FIG. 5 and any reflections from short branch 220 will travel towards the generation G/M1. Once again M2 is selected at the reference measurement location R and FIGS. 6b and 6c depict the respective time shifting in accordance with method 300 illustrated in FIG. 3.

Figure 7:
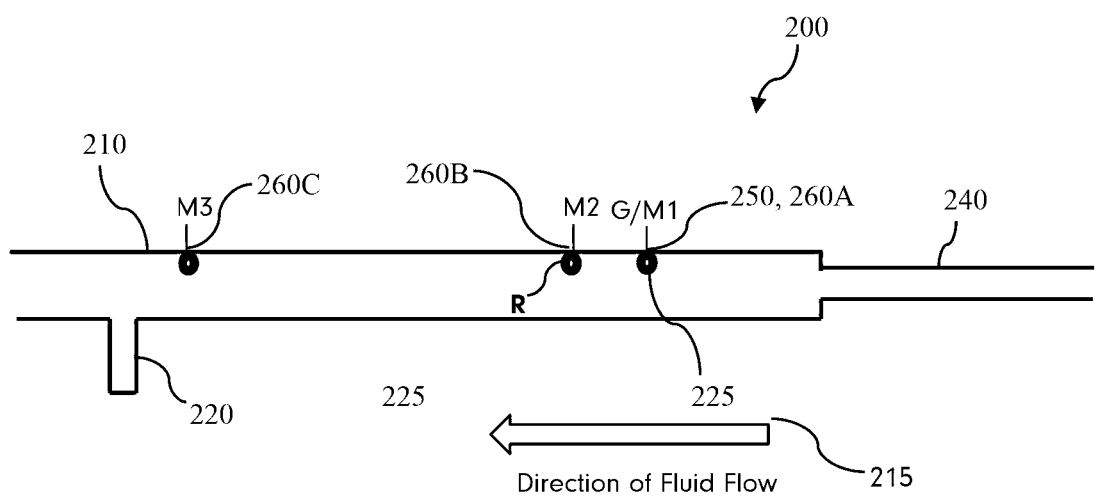
FIG. 7 is an example pipeline system depicting one arrangement of a pressure wave generator and associated measurement locations according to an illustrative embodiment.
Figure 8A:
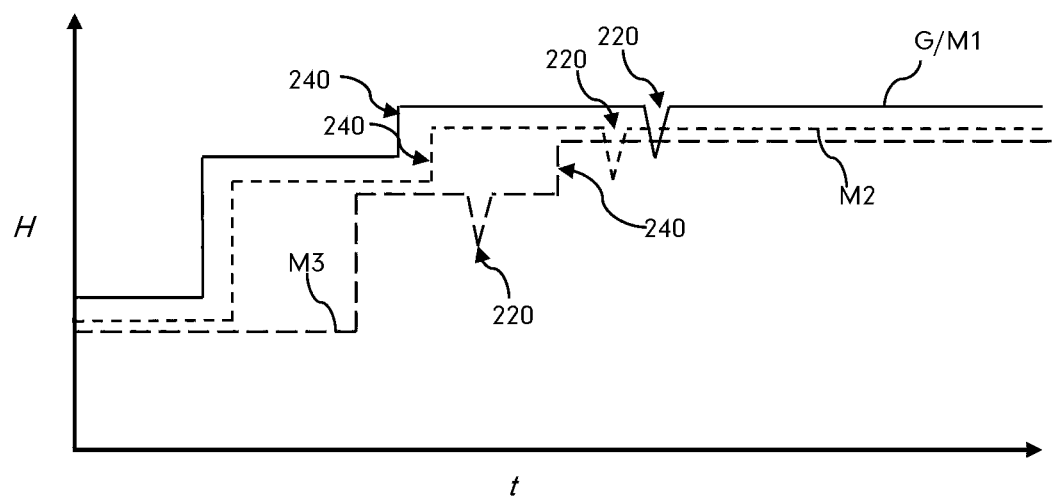
FIG. 8a is a plot of the pressure wave interaction signals detected for the example pipeline system illustrated in FIG. 7.

Referring now to FIG. 7, there is shown pipeline system 200 with yet another configuration of generation and measurement locations. Compared to FIG. 2, the configuration shown in FIG. 7 involves both measurement locations M2 and M3 located downstream (or to the left of) of generation location G/M1. Once again M2 is selected at the reference measurement location R but in this case M2 is located on the left hand side or downstream of G/M1. FIG. 8a depicts the pressure wave interaction signal measured at each measurement location.

Figure 8B:
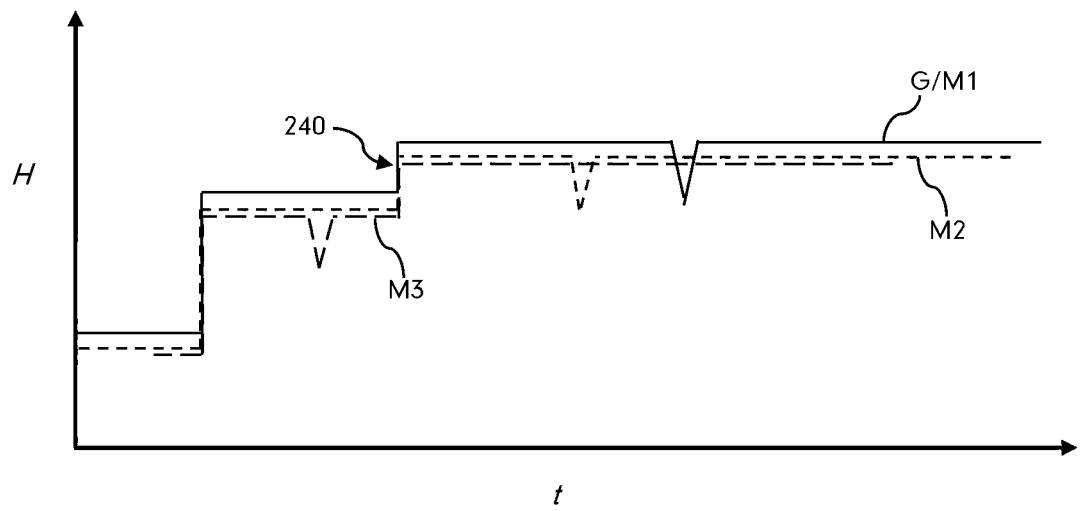
FIG. 8b is a plot of the time shifted pressure wave interaction signals illustrated in FIG. 8a to determine the location of individual features corresponding to reflections from the right hand side of the generator as depicted.
Figure 8C:
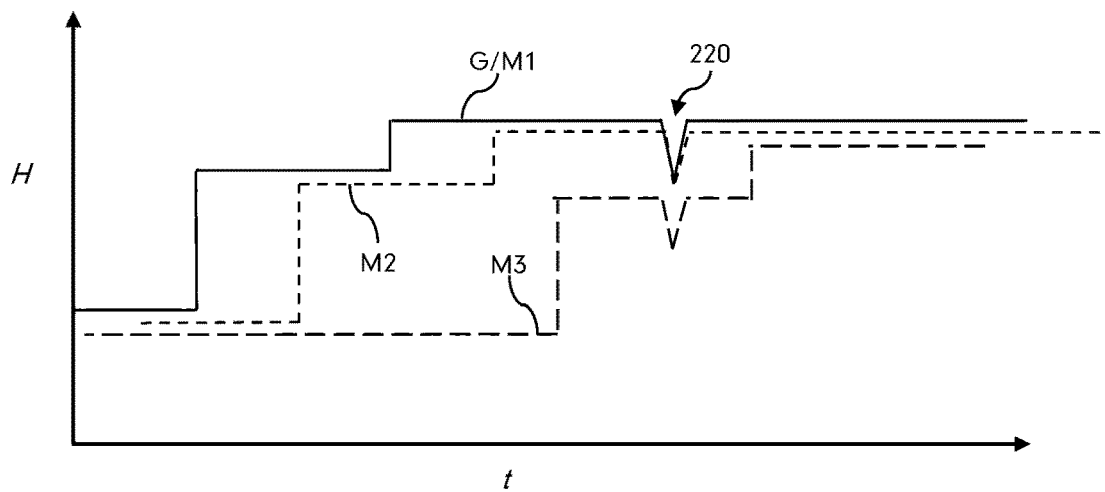
FIG. 8c is a plot of the time shifted pressure wave interaction signals illustrated in FIG. 8a to determine the location of individual features corresponding to reflections from the left hand side of the generator as depicted.

Following method 300, to identify localised variation on the opposite side of G/M1 (ie, the upstream side) a negative time shift is applied to the pressure wave interaction signals corresponding to M2 and M3 as these measurement locations are on the same side as M2 and no time shift is applied to pressure wave interaction signal corresponding to G/M1. This is shown in FIG. 8b and identifies reduced diameter section 240. To then identify localised variations on the same side of G/M1, a positive time shift is applied to M2 and M3 and no time shift is applied to the G/M1 signal. This is shown in FIG. 8c which identifies a correlated feature in the combined pressure wave interaction signals corresponding to closed short branch 220.

In another example, and referring to FIG. 7, the reference measurement R could be chosen to be at a hypothetical location located on the upstream side of G/M1. In this example, method 300 would be followed except to note that there are no actual measurement locations on the same side as the hypothetical location which functions purely as a reference point for the location analysis.

At this stage of the analysis, the location of individual features with respect to the generation location and also with respect to each other has been identified from the time shifted pressure wave interaction signals.

Referring again to FIG. 1, at step 150 the individual features are characterised to assess the condition of the pipeline.

Figure 9:
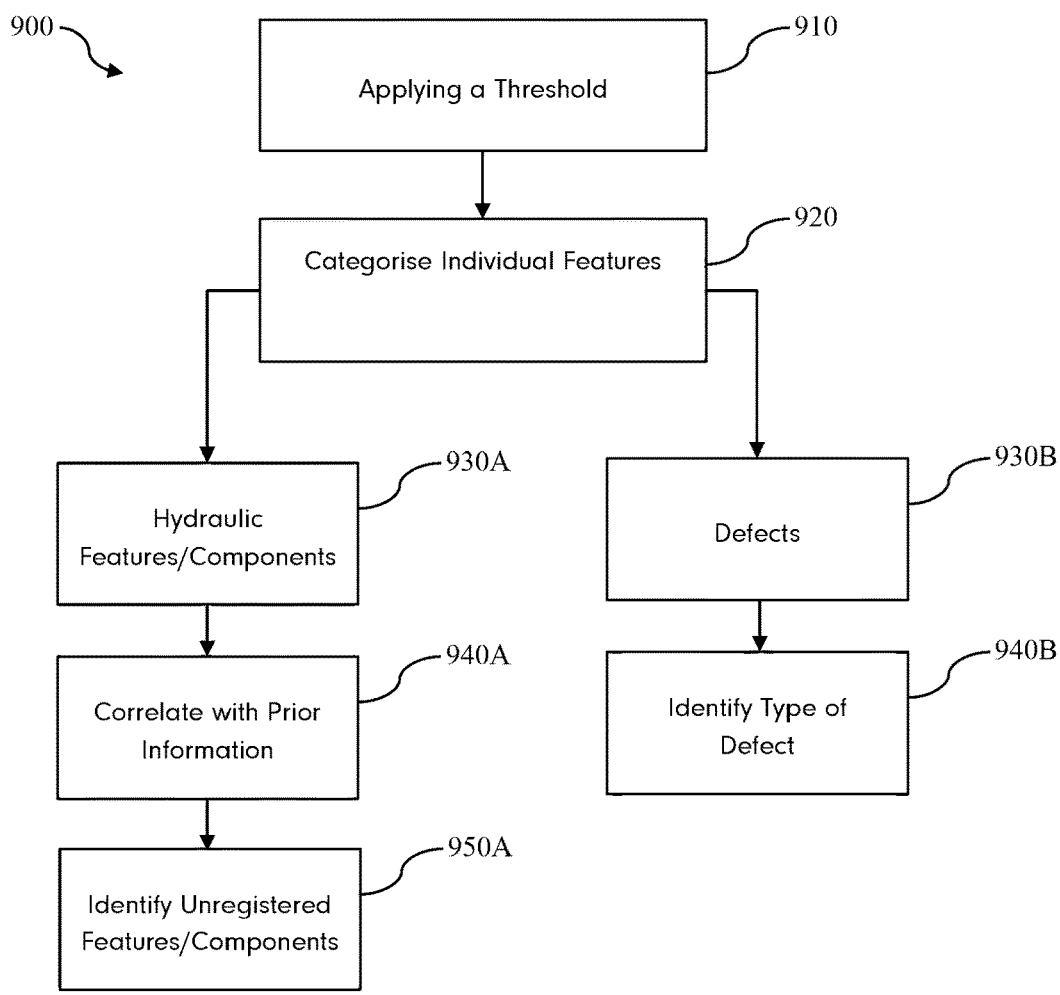
FIG. 9 is a flow chart of a method for characterising individual features of the pressure wave interaction signals according to an illustrative embodiment.

Referring now to FIG. 9, there is shown a method 900 for characterising the individual features of the pressure wave interaction signals according to an illustrative embodiment.

At step 910, a threshold is applied to the individual features whose location has been identified in the above time shifting analysis. In one embodiment, the size of the feature corresponding to the difference between the minimum and maximum head pressure must be above a minimum pressure change, or threshold pressure change. The threshold pressure change for a given pipeline system can be determined by theoretical analysis of the size of the pressure wave reflection corresponding to a specific degree of wall deterioration. An example threshold pressure change that could be applied to a cement mortar lined pipeline is the size of the reflection that would result from full or substantial cement mortar lining thickness loss.

In another embodiment, the time duration of a feature must be above a minimum time interval. The time interval of a reflection is related to the length of the feature that results in the reflection. For a deteriorated pipe section, the time interval of the corresponding reflection is the time needed for a pressure wave to travel twice the length of the deteriorated section. The minimum time interval to be considered, or the threshold time period, can be determined by theoretical analysis using an estimated wave speed and a defined minimum length to consider. In another embodiment, both of these threshold criteria are applied.

As step 920, the individual features are then categorised into two categories. At step 930A, categorisation into the first category consisting of hydraulic components and/or features the pipeline system is carried out. As would be appreciated, hydraulic components/features may be either registered or unregistered. Hydraulic components include, but are not limited to, various types of valves such as inline valves (partially or fully closed), scour valves and valves, and valves on branch pipelines (partially or fully closed); closed and open branch pipeline sections extending from the pipeline; off-takes; reservoirs; and tanks (eg, surge tanks or air vessels or chambers). Hydraulic features include, but are not limited to, changes in pipeline material, diameter, lining, wall thickness or class.

At step 940A, individual features corresponding to hydraulic components/features are correlated with prior information of the pipeline system, such as found in geographical information system (GIS) drawings and information gathered in the field. This prior information describes the location of various known hydraulic components/features and may be correlated with the individual features identified in the time-shifted and correlated pressure wave interaction signals whose location with respect to the generation location and with respect to each other is known.

At step 950A, those individual features in the time shifted pressure wave interaction signals categorised as arising from hydraulic components/features but unable to be correlated with prior information will be identified as unregistered. One example of an unregistered hydraulic component is a branch or an off-take in a pipeline. In this case, the individual feature of the time shifted pressure wave interaction signal will have part of the pressure wave being diverted and the size of the transmitted wave then being reduced. Features/components in the branch/off-take may also induce reflections.

At step 930B, categorisation into the identification of the second category of defects in the pipeline system is carried out. These are identified by the characteristics of the reflection. The reflections are those that cannot be confidently correlated with hydraulic components/features (either registered or unregistered) and may correspond to defects such as wall deterioration (eg, reduction in wall thickness) or other defects (eg, leaks, air pockets). At step 940B, the type of defect is identified.

At this stage of the analysis, individual features of the time shifted pressure wave interaction signals will have been categorised as relating to known/registered features/components of the pipeline system or unknown/unregistered features/components of the pipeline system or defects of the pipeline system. In the case of the individual features correlated to known registered features/components of the pipeline then their absolute location will be precisely known. In terms of the other individual features in the time shifted pressure wave interaction signals corresponding to unregistered features/components or defects further analysis may be carried out to determine their absolute location.

As has been discussed above, pressure wave reflections occur when a generated pressure wave encounters a physical change in the pipeline. In one example, this physical change may be a hydraulic feature such as a portion of the pipeline having a reduction in wall thickness. The pressure wave reflection then propagates back towards the pressure wave generator forming part of the pressure wave interaction signal detected at the one or more measurement locations on the pipeline system.

A further important consideration is that changes in the wall thickness or diameter of the pipeline will cause changes in the wave speed of the pressure wave as it travels along the pipeline. In order to determine the actual location of the unregistered hydraulic components/features or defects identified in the time shifted pressure wave interaction signals, it is necessary to determine the changes in wave speed that the pressure wave encounters as it propagates along the pipeline.

Figure 10:
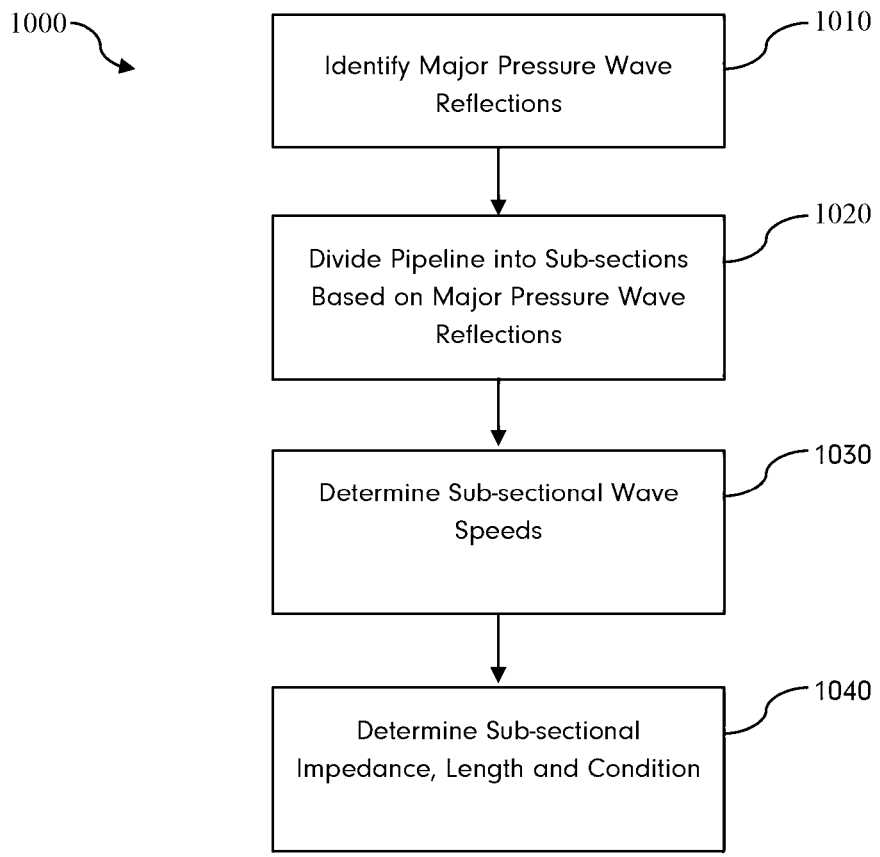
FIG. 10 is a flow chart of a method for dividing a pipeline into sub-sections and determining the wave speed in each section.

Referring now to FIG. 10, there is shown a method 1000 for dividing the pipeline into sub-sections and determining the wave speed and/or other characteristics in each sub-section. At step 1010, the major pressure wave reflections are identified in the time shifted pressure wave interaction signals. In this example, a major pressure wave reflection is determined by both the size and duration of the pressure wave reflection. In one example, the minimum size is the theoretical size of a reflection corresponding to 10% of wall thickness loss in an unlined metallic pipeline and the minimum duration of the reflection is 200 milliseconds, which corresponds to a sub-sectional length of approximately 100 m for an estimated wave speed of 1000 m/s. In another embodiment, a further criterion to be satisfied is that the pressure wave reflection is relatively stable and any fluctuations be short in duration. In one example, fluctuations should be less than 20 milliseconds, which correspond to localised defects with a length less than 10 m (with an estimated wave speed less than 1000 m/s) within the sub-section.

Accordingly, a typical major pressure wave reflection might have a minimum pressure head difference in accordance with the theoretical size of the reflection expected for a specific degree of deterioration, a duration in the order of hundreds of milliseconds to seconds with any fluctuations in the signal on a timescale of tens of milliseconds or less. At step 1020, the pipeline is divided into two or more sub-sections for analysis according to the major pressure wave reflections in the time-shifted pressure interaction signals determined in accordance with step 1010.

Figure 11:
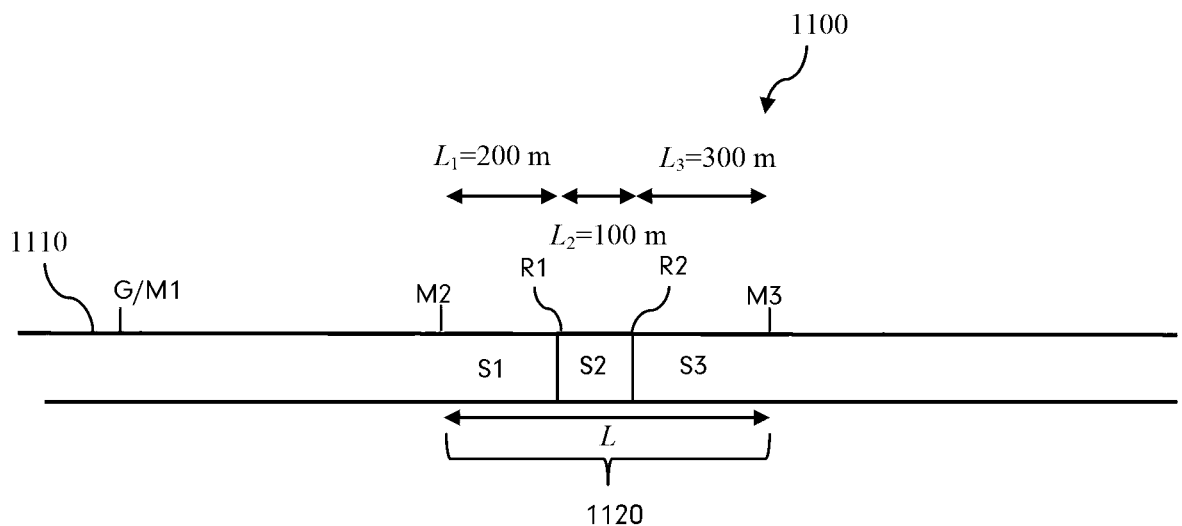
FIG. 11 is an example pipeline system testing configuration for assessing sub-sections of a pipeline according to an illustrative embodiment.

Referring now to FIG. 11, there is shown a pipeline testing configuration 1100 for assessing the sub-sections of pipeline 1110 between measurement locations M2 and M3 in accordance with an illustrative embodiment. In this illustrative example, it is known that the pipeline material outside of the section of pipeline 1120 is the same and has a known wave speed of 1000 m·s$^{-1}$. A pressure wave is generated at G/M1 and travels towards M2 and M3 which measures the pressure wave interaction signal including any pressure wave reflections.

Figure 12A:
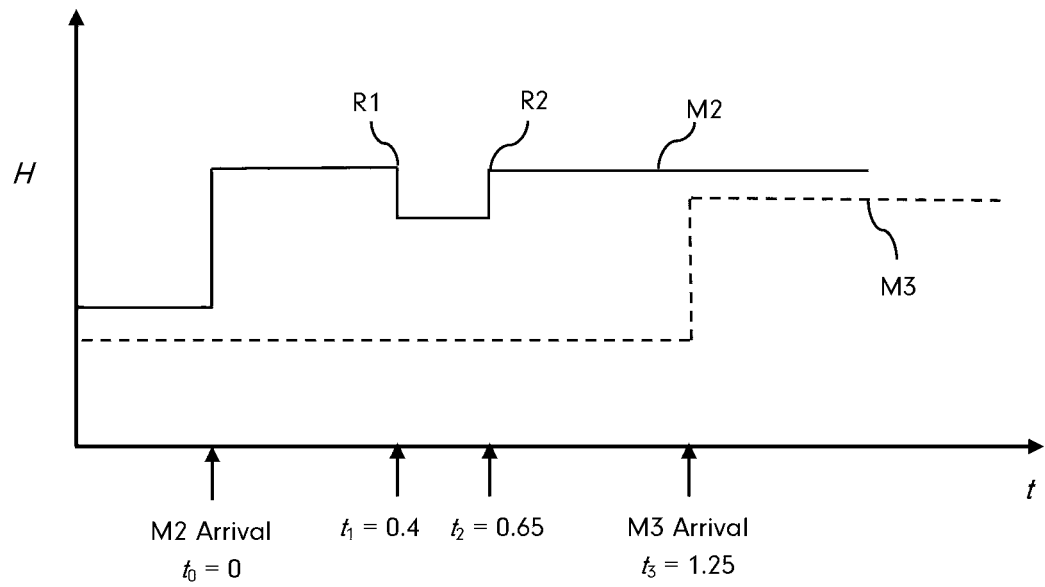
FIG. 12a is a plot of the pressure wave interaction signals for the example pipeline testing configuration illustrated in FIG. 11.

Referring now to FIG. 12a, there is shown a plot of the pressure wave interaction signals measured for M2 and M3 respectively. In this example, major pressure wave reflections are indicated on the M2 pressure wave interaction signal at R1 and R2. Accordingly, the section of pipeline 1120 between measurement locations M2 and M3 may be divided into sub-sections S1, S2, S3 as illustrated in FIG. 11.

From the difference between the time of arrival of the pressure wave at M2 and that at M3, the sectional wave speed $a_s$ for section of pipeline 1120 may then be determined. In this example the sectional wave speed for the section between M2 and M3 is given by $$a_s = \frac{2 \times L}{(t_3 - t_0)} = \frac{2 \times 600}{(1.25 - 0)} = 960 \text{ m·s}^{-1}$$

which is less than the 1000 m·s$^{-1}$ with the conclusion that section of pipeline 1120 includes a portion that has deteriorated in some manner or has changed properties compared to the surrounding pipeline.

Referring back to FIG. 10, at step 1030 the wave speed for each sub-section is determined. It may be the case that pressure wave reflections corresponding to features R1 and R2 are located at known locations. As an example, R1 and R2 may indicate the boundaries of a section of pipeline comprised of a different material that may be susceptible to corrosion or deterioration. This situation is shown in FIG. 11, where S2 is known to be between 200 m from M2 and 300 m from M3 and therefore have a length of 100 m.

In this case, the wave speeds for each sub-section may be directly calculated as follows:

$$\text{Subsection 1 } a_{s1} = \frac{2 \times L_1}{(t_1 - t_0)} = \frac{2 \times 200}{(0.4 - 0)} = 1000 \text{ m·s}^{-1}$$

-continued $$\text{Subsection 2 } a_{s2} = \frac{2 \times L2}{(t_2 - t_1)} = \frac{2 \times 100}{(0.65 - 0.4)} = 860 \text{ m.s}^{-1}$$

$$\text{Subsection 3 } a_{s3} = \frac{2 \times L3}{(t_3 - t_2)} = \frac{2 \times 300}{(1.25 - 0.65)} = 1000 \text{ m.s}^{-1}$$

where sub-sections 1 and 3 correspond to the known wave speeds outside of S2.

In other cases, the absolute locations of R1 and R2 may not be known. It is useful now to review the effect of a change in wall thickness of a pipeline and how this in turn introduces a change of impedance. The impedance of a pipeline is defined as:

$$B = \frac{a}{gA} \quad \text{Equation 1}$$

where B is the impedance of the pipeline, a is the wave speed of a generated pressure wave, g is the gravitational acceleration and A is the internal cross-sectional area of the pipe.

The wave speed a can be determined using the theoretical wave speed formula as:

$$a^2 = \frac{K/\rho}{1 + (K/E)(D/e)c} \quad \text{Equation 2}$$

in which K is the bulk modulus of elasticity of fluid, $\rho$ is the density of fluid, E is Young's modulus of the pipe wall material, D is the internal diameter of the pipeline, e is the wall thickness and c is a factor depending on the method of restraint of the pipeline.

It has been demonstrated that the size of the pressure wave reflection from a deteriorated pipe section is related to any change in the pipeline impedance of that deteriorated pipe section (see for example Gong J, Simpson A R, Lambert M F, et al., "Detection of distributed deterioration in single pipes using transient reflections", *J Pipeline Syst Eng Pract*, 2013; 4: 32-40, whose entire contents are incorporated by reference in their entirety).

The dimensionless head perturbation may be determined using:

$$H_r^* = \frac{B_r - 1}{B_r + 1} \quad \text{Equation 3}$$

where $H_r^*$ is the dimensionless head perturbation of the first reflected pressure wave and $B_r$ is the ratio of the impedance of the deteriorated pipe section to the impedance of an intact section. The dimensionless head perturbation, $H_r^*$, can also be defined from the incident and reflected transient waves as:

$$H_r^* = \frac{H_{j1} - H_i}{H_i - H_0} \quad \text{Equation 4}$$

where $H_{j1}$ is the head of the reflected pressure wave, $H_i$ is the head of the incident transient pressure wave and $H_0$ is the steady-state head at the measurement point before the generation of the transient incident pressure wave during which time the side-discharge valve-based pressure wave generator is open (see also discussion in Gong J, Lambert M F, Simpson A R and Zecchin A C. "Distributed deterioration detection in single pipes using the impulse response function", 14*th International Conference on Water Distribution Systems Analysis* (WDSA 2012), Adelaide, South Australia: Engineers Australia, 2012; 702-719 whose entire contents are incorporated by reference in their entirety)

As would be appreciated the values of $H_{j1}$, $H_i$ and $H_0$ are measurable by pressure measurement devices such as a pressure transducer. Note that although $H_0$ appears in Equation 4, the dimensionless head perturbation $H_r^*$ is independent of $H_0$. In addition, $H_r^*$ is only related to the size of the reflection ($H_{j1} - H_i$, note that this can be negative) and the size of the incident wave ($H_i - H_0$). The impedance ratio Br is given as using:

$$B_r = \frac{B_1}{B_0} \quad \text{Equation 5}$$

where the subscripts '0' and '1' represent the intact pipe section and the section with a change in impedance (the deteriorated pipe section), respectively.

Figure 12B:
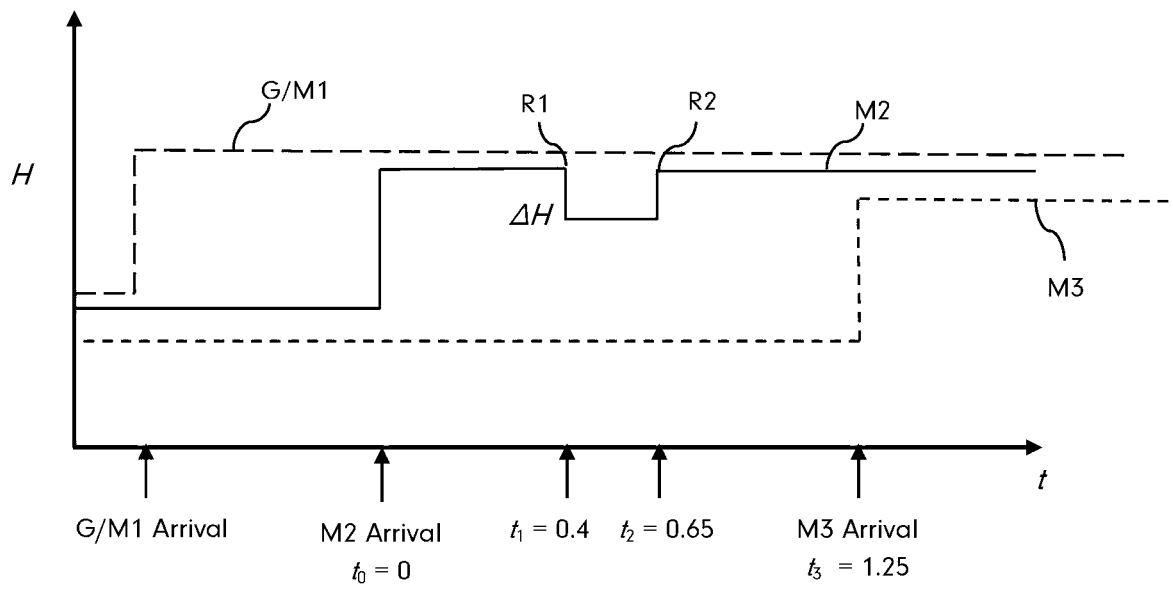
FIG. 12b is another plot of the pressure wave interaction signals for the example pipeline testing configuration illustrated in FIG. 11.

Referring now to FIG. 12*b*, there is shown a plot of the pressure wave interaction signals shown in FIG. 12*a* and further including the pressure wave interaction signal for G/M1. As the wave speed is known from G/M1 and further as the pressure wave interaction signal for G/M1 shows no features it can be assumed that the wave speed until feature R1 is $a_{s1} = 1000$ m·s$^{-1}$. Accordingly, the distance from M2 to R1 may be calculated based on the elapsed time of $t_2 - t_1 = 0.4$ seconds as:

$$L_1 = a_{s1} \times \frac{t_1 - t_0}{2} = 1000 \times 0.2 = 200 \text{ m}$$

The wave speed in S2 is then determined based on change in pressure head ΔH and from the wave speed the length of S2 may be determined and so the boundaries of sub-section S2. Further examples of this process are discussed below with respect to different types of pipelines.

A sub-sectional travel time is related to the sub-sectional wave speed and the length of the sub-section. As can be seen from above, the sub-sectional wave speed is closely related to the sub-sectional impedance, which affects the size of a wave reflection. The sectional travel time equals to the summation of the travel time in all the sub-sections which provides a useful cross check to the sub-sectional wave speed calculations as referred to above.

There is an alternative method for the determination of the sub-sectional wave speeds, which does not rely on any prior information about localised pipeline property variations responsible for the major pressure wave reflections. Assume that there are N sub-sections in the pipe section of interest based on the number of major reflections. The first sub-section is used as a reference and the impedance ratio of every sub-section to the first sub-section is determined based on the change in pressure head and Equation 3. The wave speed ratios, $r_{ai}$ (i=1, 2, 3 . . . N), are then determined because the impedance is closely related to the wave speed. As a result, the sub-sectional wave speed of any sub-section in the pipe section of interest is described by the sub-sectional wave speed of the first sub-section $a_{s1}$ multiplying a known ratio or scale factor $r_{ai}$, with the factor $r_{a1} = 1$ for the first sub-section. Using the travel time in each of the sub-sections ($t_i-t_{i-1}$) and the total length of the section of interest L, Equation 6 can be established as:

$$a_{s1}\Sigma_{i=1}^{N}r_{ai}(t_i-t_{i-1})=2L \quad \text{Equation 6}$$

From Equation 6, the sub-sectional wave speed in the first sub-section can be determined. The sub-sectional wave speed for any other sub-section can then be calculated by multiplying by the wave speed ratio.

Referring back to FIG. 11, the sub-sectional wave speed analysis 1030 is followed by a systematic analysis of the size and duration of the major pressure wave reflections in the time-shifted pressure wave interaction signals to determine pipeline characteristics such as the impedance and length of each sub-section at step 1040. The sub-sectional wave speed and the sub-sectional impedance are indicative of the condition of the subsections. The equivalent remaining wall thickness of each sub-section can be estimated using these results combined with Equation 1 and Equation 2. As would be appreciated, the sub-sectional analysis allows for the characteristics of the pipeline to be assessed without having to carry out a full inverse transient analysis.

Figure 13:
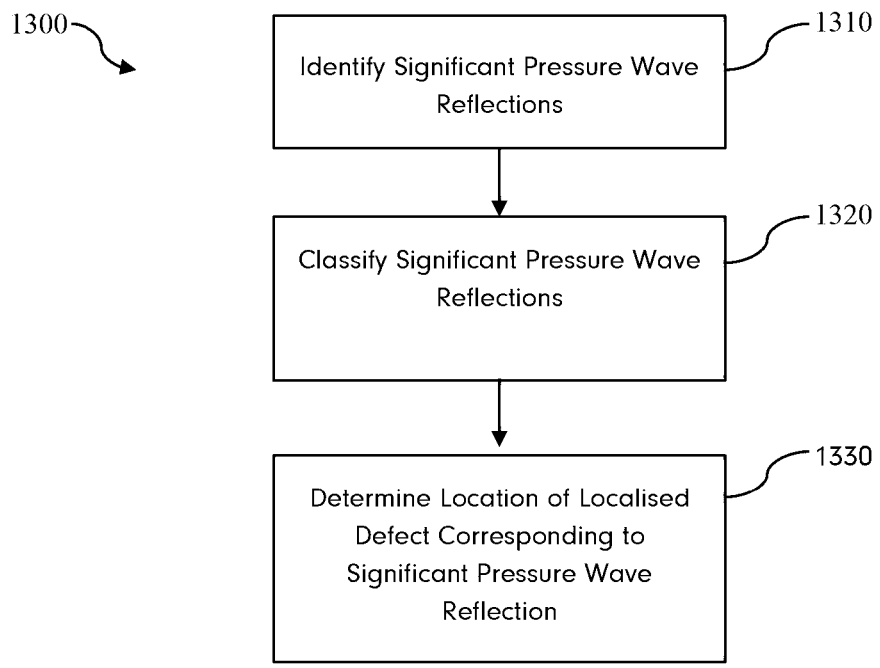
FIG. 13 is a flowchart of a method for determining localised defects in the pipeline according to an illustrative embodiment.

Referring now to FIG. 13, there is shown a method 1300 for determining localised defects in the pipeline according to an illustrative embodiment.

At step 1310, the significant pressure wave reflections are identified in the time shifted pressure wave interactions signals. A significant pressure wave reflection is characterised by a significant difference in pressure head but is of a relatively short duration. This step focuses on the analysis of reflections significant in size but short in duration.

At step 1320, the significant pressure wave reflections are classified according to which type of localised defect in the pipeline is the origin of the pressure wave reflection. Some types of localised defects include, but are not limited to, short reaches in the pipeline with significant wall deterioration, leaks, blockages or air pockets. For short reaches with significant wall deterioration, the impedance of the reach may be determined from the size of the pressure wave reflection. The wave speed and wall thickness of the reach may then also be determined. For other localised defects, such as leaks, blockages or air pockets, the size of the reflection may be used to estimate the severity (eg, how much opening area remains at the blockage).

At step 1330, the location of the localised defect is determined using the sub-sectional wave speed with time-domain reflectometry (TDR) analysis. Firstly, the total length of all the sub-sections between the generation location and the sub-section in which the localised defect is located is calculated using the results of the sub-sectional length obtained from step 1030. The distance between the localised defect and the boundary of the sub-section where the localised defect is located (the boundary closer to the generation location) is calculated by multiplying the corresponding sub-sectional wave speed by the time difference between the arrival time of the defect-induced reflection and that of the boundary-induced reflection and then dividing the result by 2. The location of the localised defect relative to the generation location is then determined by adding the total length of all the in-between sub-sections and the distance to the boundary of the sub-section in which the localised defect is located.

Referring now to FIGS. 14 to 18, there are shown a number of example pipeline system testing configurations including a pipeline system 1410 and a section of interest 1420 in the pipeline system 1410 that is to be assessed. In these example pipeline systems, the focus is the appropriate testing configuration that may be employed to characterise a section of pipeline to obtain pressure wave interaction signals that may be processed and analysed in accordance with the various methods described above.

Figure 14:
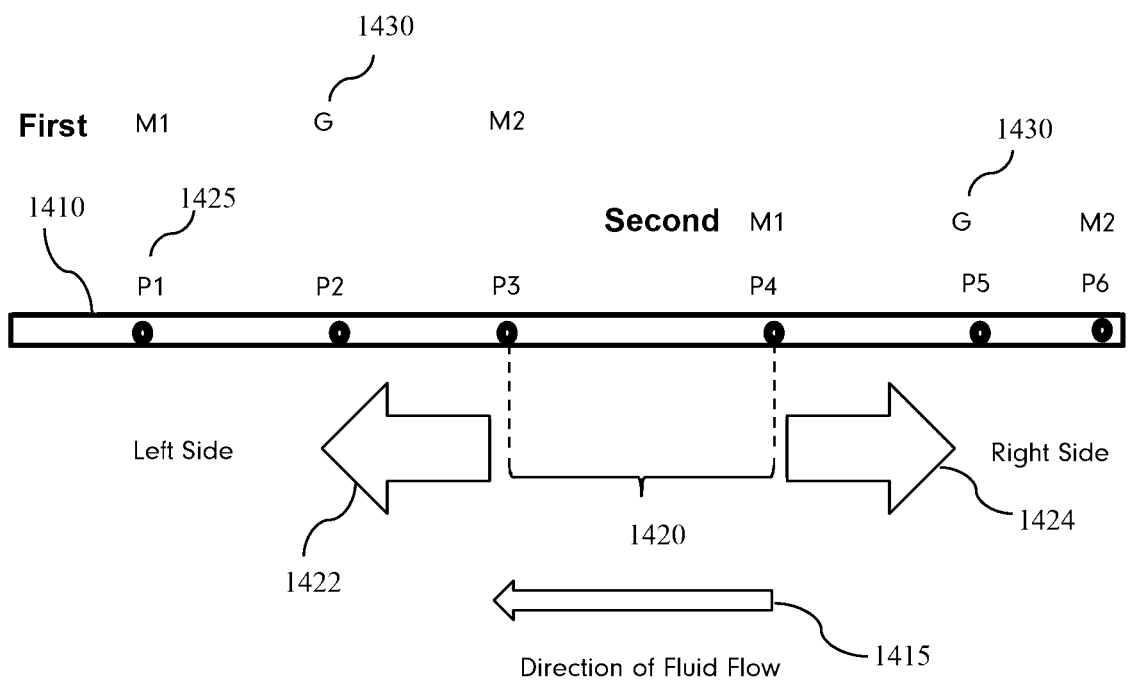
FIG. 14 is an example pipeline system testing configuration for assessing a section of interest of the pipeline according to an illustrative embodiment.

In the example testing configuration shown in FIG. 14, fluid is flowing from right to left as indicated by arrow 1415. Relative to the section of interest 1420, there is defined a left side region as indicated by arrow 1422 and a right side region as indicated by arrow 1424. Relative to the direction of fluid flow 1424, the left side region 1422 is the downstream region and the right side region 1424 is the upstream region. Pipeline system 1410 further includes a series of access points 1425 indicated by P1, P2, P3, P4, P5 and P6. In this illustrative embodiment, the section of interest 1420 is that section of the pipeline system defined or bounded by access points P3 and P4.

A first pressure wave is generated in the fluid being carried along the pipeline system 1410 by pressure wave generator G 1430 at a location on the left hand side 1422 of the section of pipeline 1420 that is to be investigated and assessed. In the example configuration shown in FIG. 14, the first pressure wave is generated at access point P2, but equally the first pressure wave could have been generated at any location left side of section of interest 1420 including access points P1 and P3.

Multiple pressure wave interaction signals are then measured by pressure measuring devices at a first set of one or more measurement locations along the pipeline system 1410. In this example, the first set of measurement locations includes M1 and M2 located at access points P1 and P3.

A second pressure wave is generated in the fluid being carried along pipeline system 1410 by either the same or a different pressure generator G at a location upstream 1424 of the section of pipeline 1420 that is to be investigated and assessed. In the example configuration as shown in FIG. 14, the second pressure wave is generated at access point P5, but equally the second pressure wave could have been generated at any location upstream of section of interest 1420 including access points P4 and P6.

Again multiple pressure wave interaction signals are then measured by pressure measurement devices at a second set of one or more measurement locations along the pipeline system 1410. In this example, the second set of measurement locations includes M1 and M2 located at access points P4 and P6 respectively.

Figure 15:
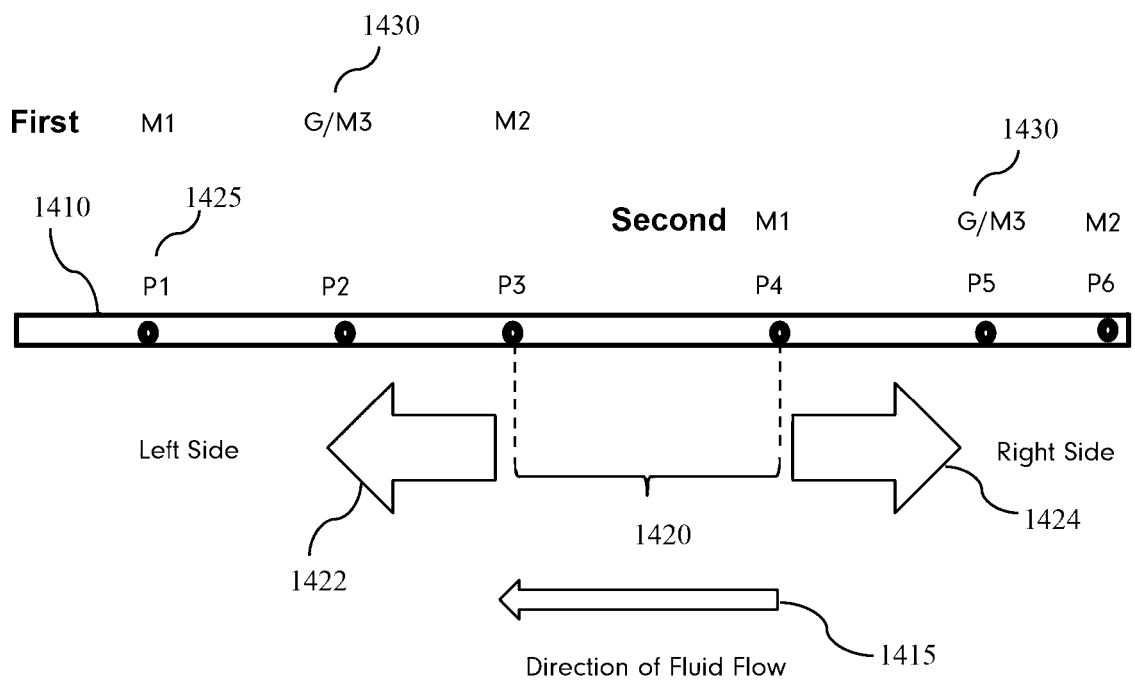
FIG. 15 is an example pipeline system testing configuration for assessing a section of interest of the pipeline according to another illustrative embodiment.
Figure 16:
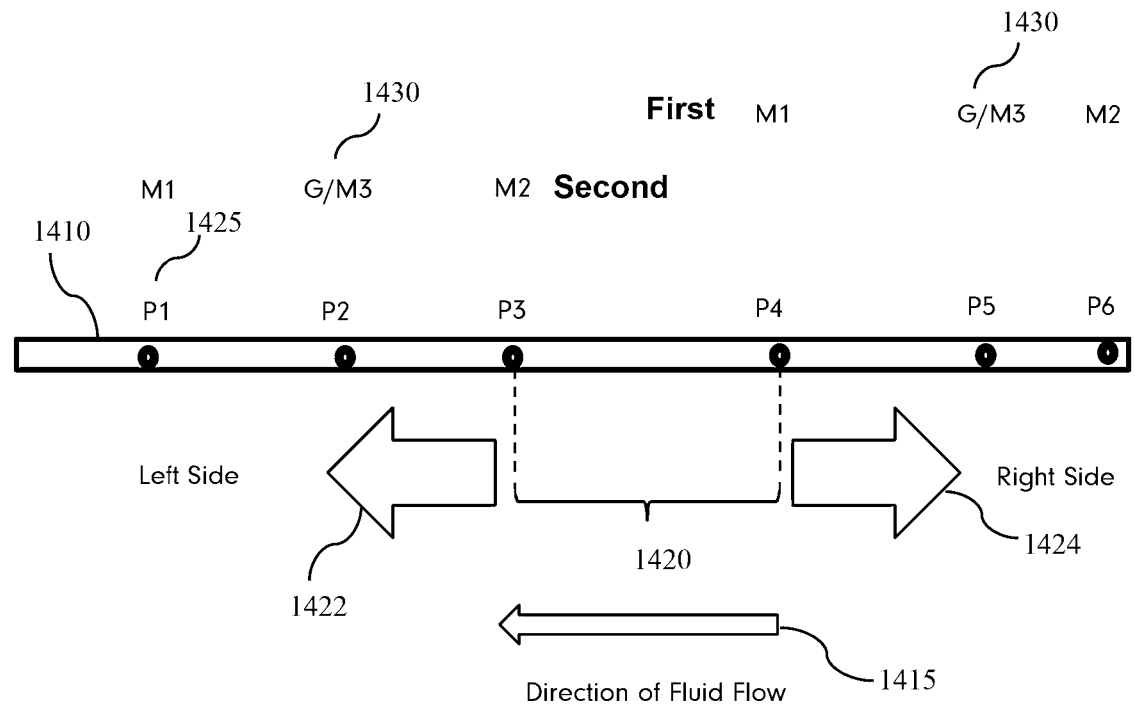
FIG. 16 is an example pipeline system testing configuration for assessing a section of interest of the pipeline according to yet another illustrative embodiment.

As would be appreciated, the example configuration illustrated in FIG. 14 may be varied as required. As shown in FIG. 15, and has been previously discussed, the pressure wave generator G 1430 may also include a measurement capability and so also correspond to a further measurement location for measuring the pressure wave interaction signals. In addition, the first pressure wave may be generated on the right side 1424 of section of pipeline 1420 and the second pressure wave then generated on the left side 1422 of section of pipeline 1420 as illustrated in FIG. 16.

Figure 17:
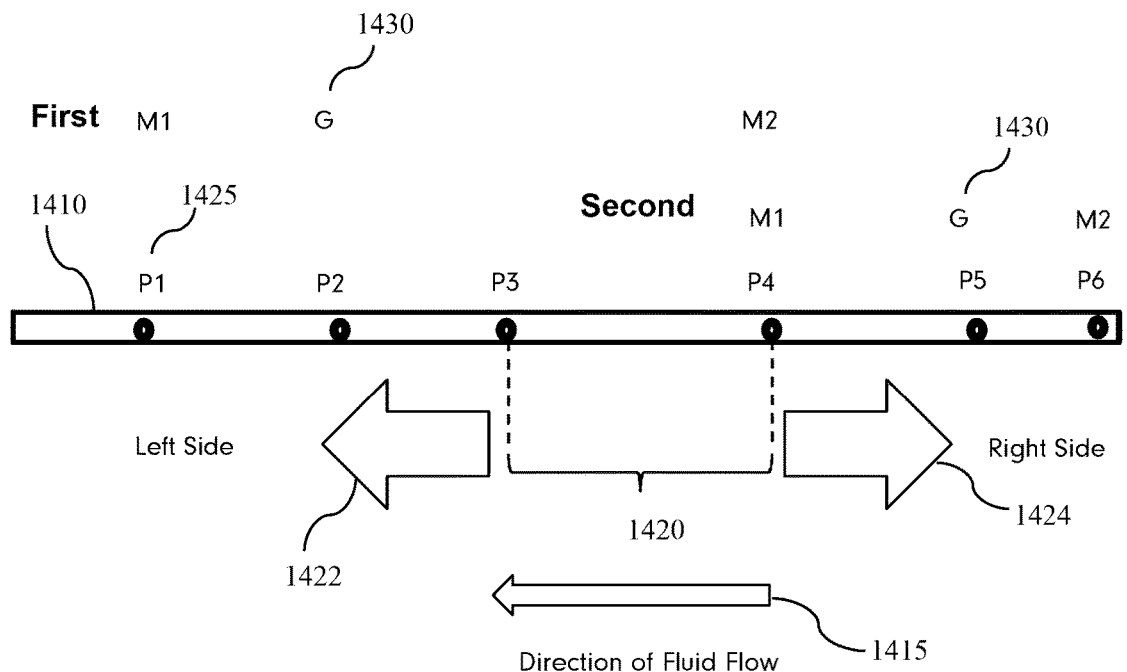
FIG. 17 is an example pipeline system testing configuration for assessing a section of interest of the pipeline according to a further illustrative embodiment.
Figure 18:
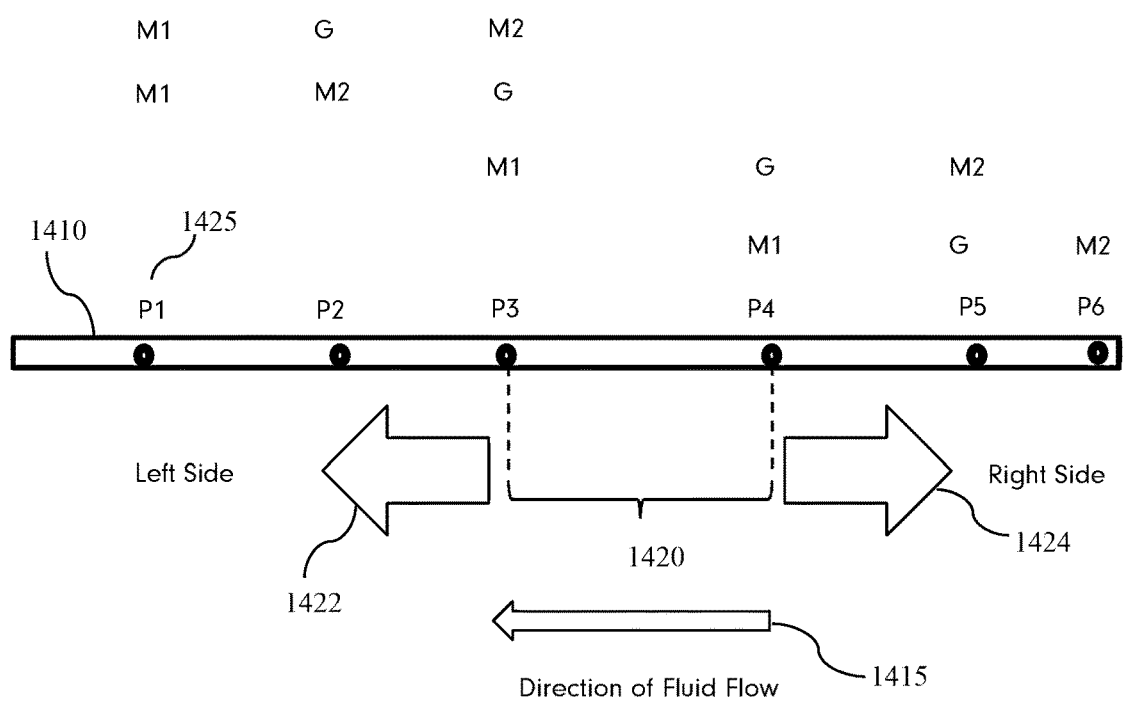
FIG. 18 is an example pipeline system testing configuration for assessing a section of interest of the pipeline according to an illustrative embodiment.

In other examples such as shown in FIG. 17, one or more of the measurement locations may be located on the opposed side of the section of pipeline 1420 from where the pressure wave is generated. It is to be understood that additional pressure waves may be generated either side of the section of interest 1420 depending on requirements. This situation is shown in FIG. 18 where two sets of pressure wave generation and corresponding measurement are carried out on each side of the section of interest 1420. Similarly, multiple sets of pressure wave generation and corresponding measurement may be carried out for each configuration of pressure generator and pressure measurement device setup.

Once the pressure wave interaction signals have been acquired for each measurement location and testing configuration, they may be processed to then determine the location of individual features with respect to the generator location in each setup and then characterised.

The Applicant has conducted a number of trials directed to different types of pipeline systems in accordance with the methods described above. These are discussed below.

Asbestos Cement Pipeline Systems

Asbestos cement (AC) pipelines constitute a significant portion of the potable and waste water systems in many countries in the world, including Australia. Most of the AC pipes in developed countries were installed before 1980, and many utilities are observing that the breakage rate is increasing with the ageing of the pipe. AC pipes are known to deteriorate mainly by three processes: lime leaching, sulphate attack and biodegradation.

Free lime (calcium hydroxide) leaches into the water conveyed by, or surrounding, an AC pipe over time through diffusion, resulting in decomposition of hydrated silicates, an increase in porosity and a loss of material strength, although typically no apparent reduction in wall thickness is observed. Soft water with a low ion content, such as pure distilled water, can cause lime leaching and wall deterioration, while acidity can enhance the process. Sulphates in the water and soil surrounding an AC pipe can react with calcium hydroxide to form calcium sulphate, which in turn can react with hydrated calcium aluminate to form calcium sulphoaluminate. The products of these reactions can induce expansion and destruction of the cementitious matrix of an AC pipe.

Recent research has shown that biofilms growing on the surface of AC pipe wall can also contribute to deterioration. Studies have found a series of bacteria, which can be categorised variously as heterotrophic bacteria, slime-forming bacteria and acid producing bacteria, in the patina layer on the inner wall of a broken AC pipe that had been in service for 35 years. Further studies have showed that these groups of bacteria can make an anaerobic and acidic local environment, accelerating the leaching of free lime and Ca-bearing minerals in hydrated cement matrix, and resulting in the reduction in the effective wall thickness (the part of wall that maintains martial strength) of an AC pipe.

The Applicant has conducted a field case study to assess the feasibility of the use of generated pressure waves and the associated analysis of the pressure wave interactions signals for condition assessment for AC pipelines. The section of AC pipe involved in the field study has known class changes. The aims of the study included locating the class changes from measured pressure wave interaction signals and the determination of the effective wall thicknesses for pipe sub-sections with different classes using sub-sectional analysis of the pipeline. In addition, analysis has also been carried out to determine significant localised defects through the analysis of significant pressure wave reflections in the pressure wave interaction signal.

For metallic pipes, wall deterioration is typically internal or external wall thinning due to corrosion. For AC pipes, however, wall deterioration is typically a reduction in the effective AC thickness due to loss of Ca-bearing minerals, while the physical thickness of the wall, as would be measured by a ruler, is not changed. As a result, an assumption is made that wall deterioration of an AC pipe may be modelled by a reduction in effective wall thickness, ie, decreasing from the original wall thickness $e_0$ to the remaining effective wall thickness $e_{eff}$, either from internal, external or both sides. The relative change in wall thickness is defined as $e_{rc}$ and represented by using:

$$e_{rc} = \frac{e_{eff} - e_0}{e_0} \qquad \text{Equation 7}$$

As referred to earlier, a reduction in effective wall thickness results in a decrease in wave speed and impedance. Using Equations 2 and 7, the wave speed in a deteriorated AC section with an effective wall thickness of $e_{eff}$ can be derived as:

$$a_1 = \sqrt{\frac{(K/\rho)(1+e_{rc})a_0^2}{(K/\rho) + e_{rc}a_0^2}} \qquad \text{Equation 8}$$

where $a_0$ is the wave speed for an intact AC pipeline with a wall thickness of $e_0$. The impedance ratio between a deteriorated AC pipe section and an intact section is the ratio between the wave speeds since the cross-sectional area does not change. As a result, $B_r$ can be written as:

$$B_r = \sqrt{\frac{(K/\rho)(1+e_{rc})}{(K/\rho) + e_{rc}a_0^2}} \qquad \text{Equation 9}$$

Substituting Equation 9 into Equation 3 results in the following expression for the dimensionless reflected head perturbation:

$$H_r^* = \frac{\sqrt{(K/\rho)(1+e_{rc})} - \sqrt{(K/\rho) + e_{rc}a_0^2}}{\sqrt{(K/\rho)(1+e_{rc})} + \sqrt{(K/\rho) + e_{rc}a_0^2}} \qquad \text{Equaton 10}$$

Equation 10 shows that the dimensionless head perturbation of a wave reflection ($H_r^*$) induced by a deteriorated AC section is related to the relative change in effective wall thickness ($e_{rc}$) and the wave speed of an intact section ($a_0$). Equation 10 can be used to detect localised defects in AC pipes provided that the incident pressure wave is generated on an AC section with a known wave speed (by either calculation or measurement).

The relative change in the effective wall thickness in a deteriorated AC section may then be determined from the size of the corresponding pressure wave reflection indicated in the pressure wave interaction signal using Equation 10, and the location of the deterioration may be calculated from the arrival time of the reflection using TDR. If the pressure measurement location is at the source of the generated pressure wave, the arrival time of a pressure wave reflection (relative to the starting time of the incident wave) is the time for the wave to travel twice the distance between the measurement location and the deterioration.

In accordance with the time shifting methods described above, a comparison of the pressure wave interaction signals measured at multiple measurement locations within the same test may be used to determine the directional information of the localised variations that are the source of any pressure wave reflection.

A sub-sectional analysis may also be carried to provide an efficient assessment of each of the sub-sections and as a result the general condition of the pipeline section tested. As described above, a section of pipeline between two measurement points is divided into two or more sub-sections for analysis according to the sizes and characteristics of the pressure wave reflections. The wave speed, length and wall condition of each sub-section may then be determined.

In this study, the experimental field work was undertaken in Victoria, Australia on a regional AC transmission main with a nominal diameter (DN) of 300 mm. The total length of the AC transmission main tested was 7.6 km. It was constructed in the 1960s and buried underground. The upstream end of the AC pipe was connected to a ductile iron pipe, which was then connected to a water storage tank far upstream. The downstream end of the AC pipe was closed during the test. Major off-takes were also closed during the test.

Figure 19:
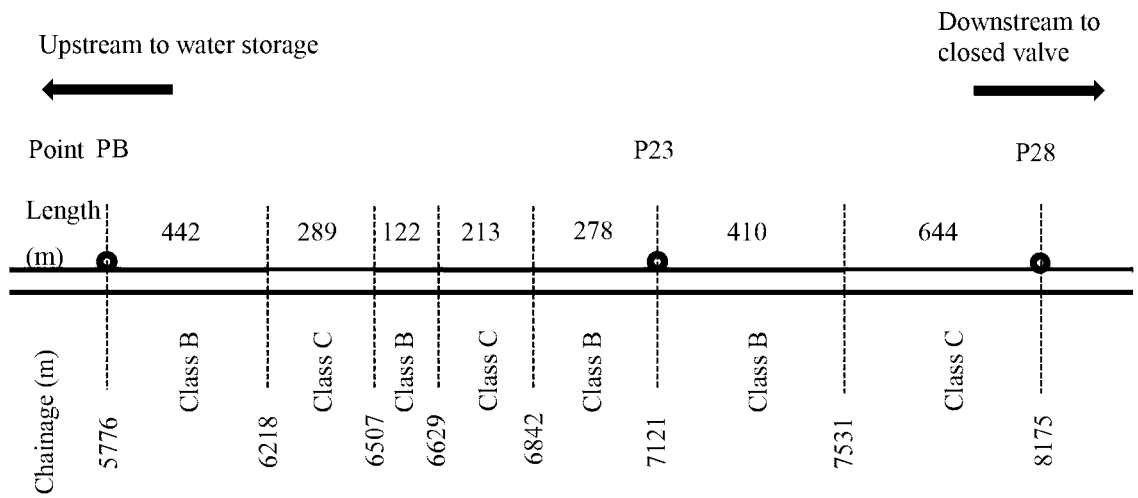
FIG. 19 is a layout diagram of a section of interest of an asbestos cement (AC) pipeline located in Victoria, Australia assessed in accordance with an illustrative embodiment.

Referring now to FIG. 19, the layout of the section of interest of the AC pipeline under test is shown as defined by reference design drawings. As depicted, white sections represent Class B pipeline portions (nominal wall thickness 17.3 mm) and grey sections are Class C portions (nominal wall thickness 25.4 mm). This AC pipeline consists of Class B and Class C DN300 AC sections according to the design drawings provided by the Victorian water utility (Eastern Gippsland Water). The frequent change in pipe class was to account for pressure differences due to the elevation changes along the pipeline. The chainage information for the class changes and the location of connection points for the pressure wave testing are also shown in FIG. 19.

The physical properties of the DN300 AC pipe are summarised in Table 1. The dimensions of the AC pipe are taken from Australian Standard 1711-1975 for asbestos cement pressure pipes. The Young's modulus of elasticity of intact AC is 32 GPa as experimentally determined from AC pipe samples. The Poisson's ratio of AC is assumed to be 0.2. The constraint factor c as used in the wave speed formula Equation 2 is calculated for thick-walled pipe with constraint against longitudinal movement. The theoretical wave speeds for intact Class B and Class C sections are calculated using Equation 2.

TABLE 1

Physical properties of Class B and Class C DN300 AC pipe at a water temperature of 25° C.

| Physical Properties at 25° C. | 300 AC Class B | 300 AC Class C |
|---|---|---|
| Outside diameter (OD) | 333.8 mm | 345.4 mm |
| Inside diameter (ID) | 299.2 mm | 294.6 mm |
| Wall thickness ($e_0$) | 17.3 mm | 25.4 mm |
| Young's modulus of elasticity ($E_C$) | 32 GPa | 32 GPa |
| Bulk modulus of water (K) | 2.24 GPa | 2.24 GPa |
| Density of water ($\rho$) | 997.1 kg/m³ | 997.1 kg/m³ |
| Poisson's ratio ($\mu$) | 0.2 | 0.2 |
| Constraint factor (c) | 1.05 | 1.09 |
| Theoretical wave speed | 996 m/s | 1092 m/s |

The testing procedure consisted of the generation of a pressure wave and the measurement of the pressure responses of the pipeline. The three connection points or measurement locations (P23, PB and P28) were either fire hydrants or air valves, which provided access to the main pipe without excavation. A customised side-discharge valve-based transient pressure wave generator was installed at generation location P23 for the main testing used for the sub-sectional analysis and then shifted to PB and P28 for the more detailed defect analysis.

In this experimental field study, the pressure wave generator was in the form of a side-discharge valve which was opened for a few minutes until the flow in the main pipe was relatively steady. Then the side-discharge valve was closed abruptly (within 10 ins) to generate a step pressure wave. A pressure transducer was installed at each of the three points to measure the pressure wave interaction signal during the test at a sampling frequency of 2 kHz.

The wave speed is of particular interest for AC pipes since wall deterioration typically alters the wave speed but does not change the cross-sectional area. A change in the effective AC wall thickness (due to wall deterioration or class change) will induce a change in the wave speed according to Equation 2. The theoretical wave speeds for AC pipe sections with different degrees of wall deterioration (ie, varying effective AC wall thicknesses) are determined to facilitate the condition assessment.

Figure 20:
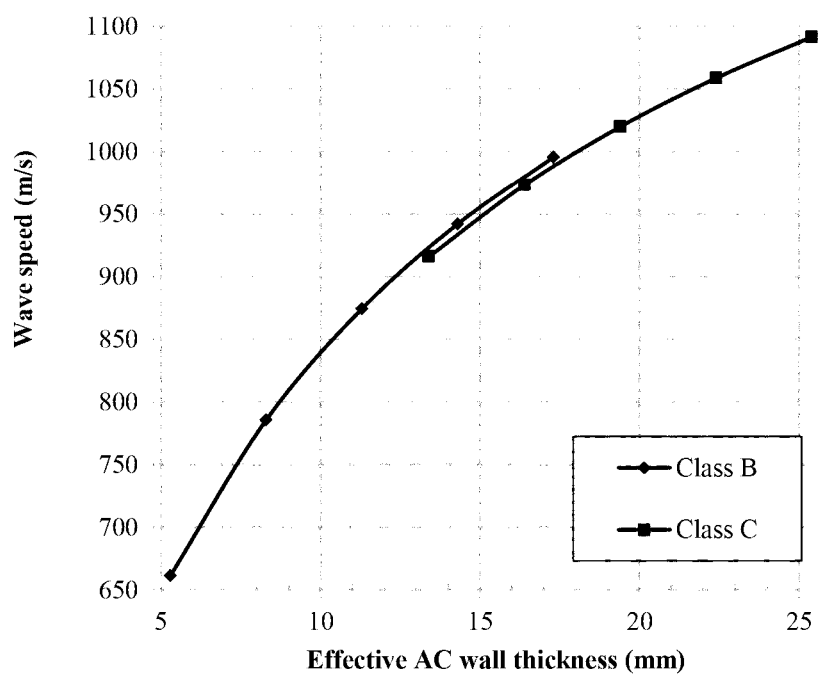
FIG. 20 is a plot of the theoretical wave speeds for the different class AC pipelines illustrated in FIG. 19 as a function of wall thickness.

Referring now to FIG. 20, there are shown the theoretical wave speeds for DN300 AC pipeline (Class B and C) with varying effective AC wall thickness where the right end of each line represents the original intact condition.

Given a measured wave reflection, the impedance ratio $B_r$ can be determined from the dimensionless head perturbation $H_r^*$ using Equation 3, and then the wave speed ratio can be calculated. For this particular experimental field study, however, there are known class changes with varying cross-sectional areas. As a result, changes in the cross-sectional area had to be considered when analysing the reflections induced by pipe class changes. Mathematical manipulation of Equation 3 to incorporate the impedance terms from Equation 4 into the impedance ratio $B_r$ yields:

$$a_r = A_r \frac{1 + H_r^*}{1 - H_r^*} \qquad \text{Equation 11}$$

where $a_r$ is the ratio of wave speeds (the wave speed of the section receiving the incident pressure wave to that of the section from which the wave departs), and $A_r$ is the corresponding ratio of cross-sectional areas. If there is no change in cross-sectional area, eg, the pipeline under test is uniform in class, then the value of $A_r$ is unity. For this case study, and considering a wave propagating from a Class B section to a Class C section, the value of $A_r$ was calculated as 0.969 using the diameter information given in Table 1.

Analysis is also conducted to determine the theoretical size of dimensionless head perturbation induced by varying degrees of relative wall thickness changes. Using Equation 10 and the pipeline information given in Table 1, the expected variation in the dimensionless head perturbation ($H_r^*$) resulting from the pressure wave reflection from localised variations in the pipeline that correspond to various relative change in wall thickness ($e_{rc}$) is calculated for both Class B and Class C AC pipes and the results are plotted in FIG. 21.

Figure 21:
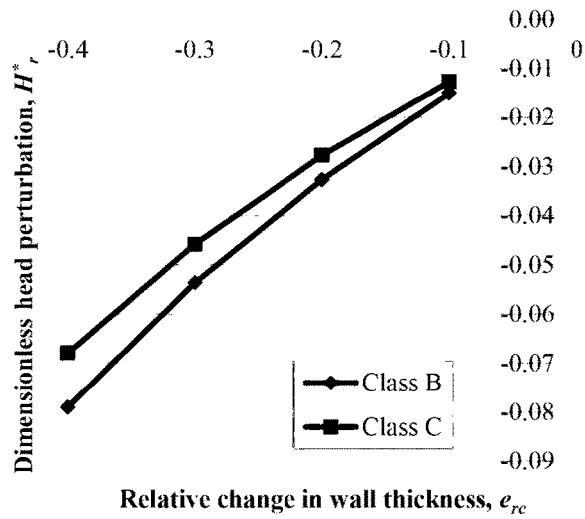
FIG. 21 is a plot of the variation in the dimensionless head perturbation according to various relative changes in wall thickness for the different class AC pipelines illustrated in FIG. 19.

It can be seen from FIG. 21 that approximately 20% reduction in effective AC wall thickness ($e_{rc}$=−0.2, 3.46 mm for Class B and 5.08 mm for Class C) will introduce a negative pressure wave reflection with a size 3% of the incident wave ($H_r^*$=−0.03). This can be used as a threshold to determine the significance of the reflections.

For the main test, an incident step pressure wave (magnitude 8.06 m) was generated at P23. The incident step wave was captured by the transducer at measurement location P23 directly after the generation, and it took 1.3355 s and 1.0255 s for the wave front to travel to PB and P28, respectively.

Figure 22:
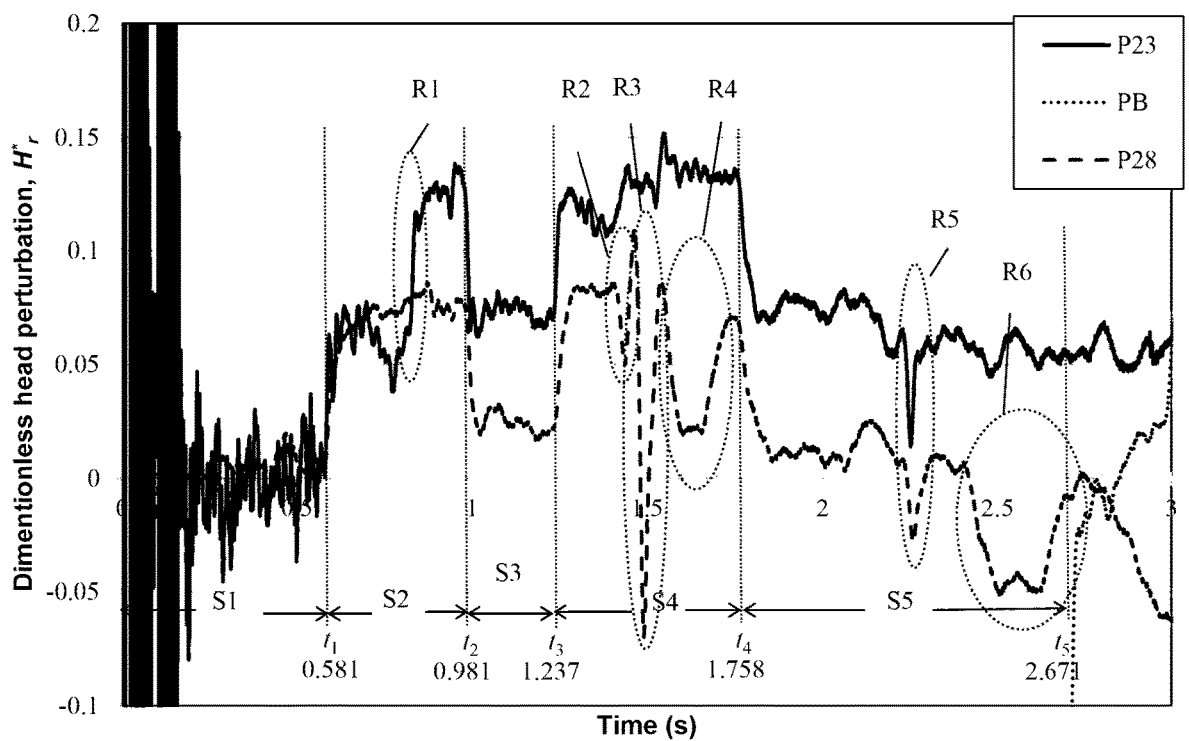
FIG. 22 is a plot of the time shifted pressure wave interaction signals for the section of interest illustrated in FIG. 19.

Referring now to FIG. 22, there is shown the dimensionless head perturbations ($H_r^*$ in Equation 4) or pressure wave interaction signals measured at measurement locations P23, PB and P28 (with the generation location at P23), time-shifted to line up reflections coming from the upstream side of P23 (the left side of P23 in FIG. 19). S1 to S5 represents five sub-sections for analysis between PB and P23, R1 to R6 are significant reflections for localised defect detection.

Referring now to the time-shifted dimensionless head perturbations measured at the three points shown in FIG. 22. The start time of the wave front measured at P23 is set to zero. The time-shifting was conducted based on the process 300 described in FIG. 3. The pressure trace measured at P28 is shifted backward in time (a negative shift 330A in FIG. 3) to make the wave front line up with the wave front as measured at P23. The pressure trace measured at PB is shifted forward in time (a positive shift 330B in FIG. 3) to double the original time interval between the wave fronts as measured by PB and P23.

As has been discussed above, time shifting of the pressure wave interaction signals is undertaken to help to identify the reflections induced by anomalies in the pipe section between PB and P23. Reflections induced by anomalies on the upstream side of P23 (the left side of P23 in FIG. 19) as measured by different transducers will line up in time in the time-shifted plot, while reflections from the downstream side of P23 (the right side of P23 in FIG. 19) will not.

As can be seen, the beginning of the pressure wave interaction signal (0.2 s) measured at the generation point (P23) is contaminated by high frequency pressure oscillations occurring in the stand pipe that connects the side-discharge valve and the main pipe. As is clear in the signals, this induced noise at the generator does not have a significant effect on the pressure wave interaction signals measured away from the generation points (e.g., the dashed line measured at P28).

From the time-shifted pressure traces (as shown in FIG. 22), five sub-sections (S1 to S5) for sub-sectional analysis are identified based on the lined up major pressure wave reflections that indicate large and extended changes in pressure. Six significant pressure wave reflections (R1 to R6), which are significant in magnitude (size greater than 0.03) but short in duration, are also identified for localised defect detection.

Sub-sectional condition assessment is implemented on the section between PB and P23 by reference to the method 1000 outlined in FIG. 10. The first step is to identify which reflections are induced by anomalies located within the section of interest (1010 in FIG. 10). It can be seen from FIG. 22 that between the wave fronts measured by P23 (solid line) and P28 (dotted line), reflections at $t_1$ to $t_4$ and reflection R5, as measured by P23 and PB (dashed line), are aligned respectively at the same time point. This alignment indicates that the sources of the reflections (the anomalies) are located upstream of P23 (the direction towards PB). In particular, they are located between P23 and PB, with the reflection from an anomaly closer to P23 arriving earlier in time. There are also reflections that do not line up (eg, reflections R1 to R4 and R6), and they are induced by anomalies located on the downstream side of P23 (the direction towards P28).

To identify whether a pressure wave reflection is a major pressure wave reflection a check is carried out to determine if the aligned reflection introduces a large pressure change that extends for a period of time (typically more than 0.1 second). As can be seen, reflection R5 is significant but is too short for sub-sectional analysis. It will be addressed in the localised defect detection. In this example, the assignment of sub-sections actually follows the change in pipe class, which will become clear in the final results. The arrival time of the reflections induced by the boundaries between sub-sections are denoted as $t_1$ to $t_5$ and given in FIG. 22. Note that the time 1, is the time-shifted starting time of the wave front recorded at PB. Considering that the starting time of the wave front measured at P23 has been set to zero ($t_1$=0 s) and the pressure trace for PB is shifted forward in time to double the original time interval between the wave fronts, $t_5$ is the time interval needed for a pressure wave traveling twice the distance between P23 and PB.

The second step is to divide the section of pipe bounded by the two measurement points PB and P23 into sub-sections (step 1020 in FIG. 10). Considering the timing and sizes of the aligned reflections (reflections at $t_1$ to $t_4$ and reflection R5), the section of pipe between PB and P23 is divided into five sub-sections, as represented by S1 to S5 in FIG. 22.

The third step is to determine the average wave speed of each sub-section (step 1030 in FIG. 10), denoted by $a_{S1}$ to $a_{S5}$ for sub-sections S1 to S5. All the sub-sections may already be in a deteriorated state at the time of testing, so that all the sub-sectional wave speeds are unknown and yet to be determined. From the dimensionless head perturbation and Equation 11, the relationship between the wave speeds of two adjacent sub-sections may be determined. For example, from FIG. 22, when a step incident pressure wave travels from S1 to S2, at time $t_1$, the size of the dimensionless head perturbation ($H_r^*$) of the reflection is approximately 0.064 (where the magnitude of a head change is determined by fitting a flat line to the pressure wave interaction signal before and after the head change).

As a result, the ratio of $a_{S2}$ to $a_{S1}$, denoted as $a_{r2}$, is calculated as 1.102 using Equation 11 (note that $A_r$=0.969 was used in the calculation of $a_{r2}$). Similarly, the ratios of $a_{S3}$, $a_{S4}$ and $a_{S5}$ to $a_{S1}$ are calculated as $a_{r3}$=1.006 (with $H_r^*$=0.003, $A_r$=1), $a_{r4}$=1.092 (with $H_r^*$=0.059, $A_r$=0.969) and $a_{r5}$=0.994 (with $H_r^*$=−0.003, $A_r$=1), respectively. Note that the dimensionless size of reflection R1 (0.052) has to be subtracted from the readings from the solid line (P23) in FIG. 22 to yield the correct values of dimensionless head perturbations for S3, S4 and S5.

For the i th sub-section, the relationship between the sub-sectional wave speed and the sub-sectional length is governed by:

$$a_{Si}(t_i - t_{i-1}) = 2L_i \qquad \text{Equation 12}$$

where $L_i$ is the length of the i th sub-section. Summarizing the corresponding equations for all the sub-sections, and using the wave speed ratios and the baseline wave speed $a_{S1}$ to represent the sub-sectional wave speeds, the final equation is $$a_{S1} \sum_{i=1}^{N} a_{ri}(t_i - t_{i-1}) = 2L \qquad \text{Equation 13}$$

where N is the total number of sub-sections (5 in this study), $a_{r1}$ is always unity, $t_0$ is the starting time of the wave front measured at the generation point in the time-shifted dimensionless head perturbation plot (zero in this study), and L is the length of the section between two measurement points (1345 m in this study). The values of $t_0$ to $t_5$ and $a_{r1}$ to $a_{r5}$ are then substituted into Equation 13 to calculate the value of $a_{S1}$, which is determined as 976 m/s. Using the ratios $a_{r2}$ to $a_{r5}$, the values of $a_{S2}$ to $a_{S5}$ can be determined and the results are summarised in Table 2. Note that Equation 13 is equivalent to Equation 6 discussed previously.

Additional steps that may be carried out to characterise the sub-sections include calculating the length of each sub-section (part of step 1040 in FIG. 10). This may be achieved by using the previously determined average sub-sectional wave speeds ($a_{S1}$ to $a_{S5}$) and Equation 12. The results of the sub-sectional lengths are also summarised in Table 2.

A further additional step is to then determine the remaining average effective AC wall thickness (part of step 1040 in FIG. 10). The effective AC wall thickness of a sub-section is linked to the determined sub-sectional wave speed by Equation 2. FIG. 20 can then serve as a look-up chart to obtain the effective wall thickness of each sub-section. The results of the effective AC wall thicknesses for the five sub-sections are summarised in Table 2 below.

TABLE 2

Determined wave speeds, lengths and effective AC wall thicknesses for the five sub-sections between PB and P23, with comparison to the theoretical values for intact pipes.

| Sub-section | Wave Speed (m/s) | | Length (m) | | Effective Wall Thickness (mm) | |
|---|---|---|---|---|---|---|
| | Theoretical | Determined | From Drawings | Determined | Theoretical | Determined |
| S1 | 996 | 976 | 278 | 284 | 17.3 | 16.2 |
| S2 | 1092 | 1076 | 213 | 215 | 25.4 | 24 |
| S3 | 996 | 982 | 122 | 126 | 17.3 | 16.5 |
| S4 | 1092 | 1066 | 289 | 278 | 25.4 | 23.1 |
| S5 | 996 | 970 | 442 | 443 | 17.3 | 15.8 |

Comparing the determined sub-sectional wave speeds, sub-sectional lengths and effective AC wall thicknesses with the known class changes (FIG. 19), it is apparent that the five sub-sections correspond to the pipe sub-sections with class changes between points PB and P23. The theoretical wave speed and wall thickness for each sub-section when it is intact (as shown in Table 1), and the sub-sectional lengths read from the design drawings, are also presented in Table 2 for comparison. Note that the theoretical results do not necessarily represent the 'real condition' of the pipeline since the pipe has been in use for decades and deterioration is expected. The difference in the wall thicknesses between Class B and Class C DN300 AC pipe sub-sections is 8 mm when they are intact or with the same degree of wall deterioration.

This wall thickness change is successfully detected with reasonable accuracy. The determined length of each sub-section is also consistent with the designed lengths, where the relative difference is less than 4% in all cases. The results show that all these AC sub-sections have a mild wall deterioration with a reduction in average effective AC wall thickness of up to 2.3 mm. Overall, the results verify that the sub-sectional condition analysis technique is effective for assessing the wall condition of sub-sections within a long section of pipe bounded by two measurement points.

The previous sub-sectional condition assessment gives the average wall condition of the sub-sections within a long pipe section bounded by two measurement points, which is a medium resolution assessment technique when compared with the low resolution acoustic-based average wall thickness estimation.

For significant deterioration with a short length, which are categorised as localised defects, a different approach, namely localised defect detection, is used for comprehensive analysis of the wave reflection and other known information. The localised defect detection complements the sub-sectional condition assessment by providing high resolution information at specific locations and is carried out in accordance with method 1300 outlined in FIG. 13.

Using the threshold of $H_r^*=-0.03$ (representing 20%, or 4 to 5 mm, reduction in the effective AC wall thickness) as discussed in a previous section, six significant pressure wave reflections R1 to R6 are identified in the time-shifted pressure wave interaction signals in FIG. 22. In this example, among the six reflections, only R5 is a lined-up reflection. This indicates that R5 is induced by an anomaly located between P23 and PB, and in particular, within sub-section S5, while the other five are from anomalies located downstream of P23 and thus outside of the section of interest. The analysis of reflection R5 is shown here to illustrate the process of localised defect detection and how to determine the type and properties of the defect among various possibilities.

Reflection R5 is a significant negative reflection with a short duration. Based on experience and the system information available, the corresponding anomaly may be classified as most likely to be: a deteriorated section with a short length, a short section replaced by plastic pipe, or an air pocket. Considering the distance between the anomaly and the generation point is relatively long (over 1 km), the setup of the testing configuration as shown in FIG. 22 is not ideal for detailed analysis of reflection R5, as explained in the following.

The incident pressure wave generated by the side-discharge valve-based generator typically has a tilted wave front with a rise time of approximately 10 ms. While traveling along a pipeline, the incident wave experiences signal dispersion, which increases the time span of the wave front. As a result, the spatial resolution (the minimum length of a deteriorated section that can be correctly identified) decreases with distance. If the length of a deteriorated section is shorter than $T_r a/2$ (where $T_r$ is the rise time of the wave front and $a$ is the wave speed in the deteriorated section), the recorded wave reflection induced by the short deterioration may not be as significant as it would be if it had a length longer than the threshold. Using the wave speed 900 m/s (corresponding to sections with approximately 12 mm effective AC wall thickness remaining) and a rise time of 10 ms as a guideline for this experimental study, the length threshold is calculated as approximately 4.5 m. More discussions on how the rise time of the wave front affects the spatial resolution can be found in Gong J, Simpson A R, Lambert M F, et al., "Detection of distributed deterioration in single pipes using transient reflections", *J Pipeline Syst Eng Pract*, 2013; 4: 32-40, whose entire contents are incorporated by reference in their entirety.

Accordingly, the results from another pressure wave test with the generation point at PB are used to further analyse the localised defect. Compared with P23, PB is much closer to the anomaly under study, so that the wave front as generated at PB is still sharp when it arrives at the anomaly and can deliver relatively high spatial resolution.

Figure 23:
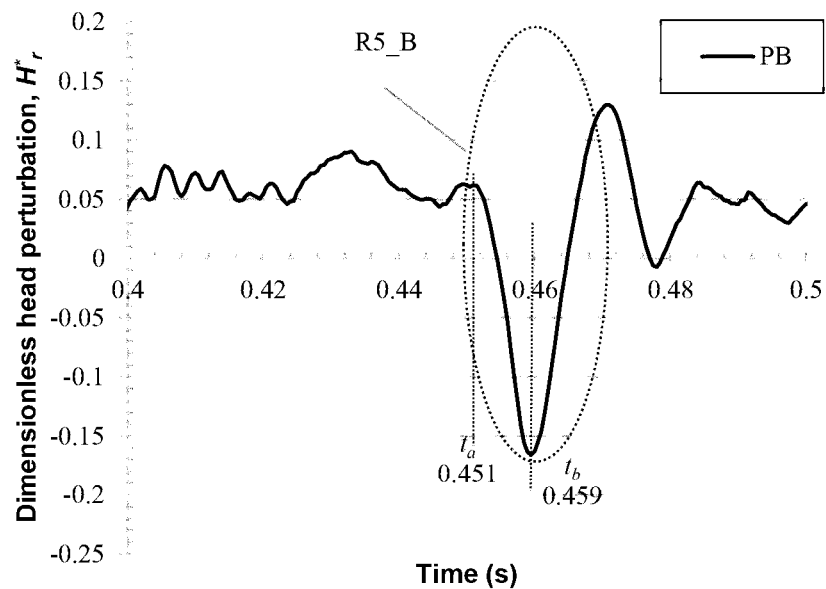
FIG. 23 is a plot of the time shifted pressure wave interaction signal depicting a significant pressure wave reflection.

Referring now to FIG. 23 there is shown the time shifted dimensionless head perturbation or pressure wave interaction signal measured at point PB with generation at PB. Reflection R5_B is induced by the localised defect that corresponds to R5 in the test shown in FIG. 22. Note that only the part of the trace that highlights the reflection from the specific anomaly under study is shown, and this reflection is named as R5_B in this test.

Analysis starts with calculating the change in impedance and wave speed from the size of the reflection using Equation 3. From FIG. 23, the dimensionless size of the reflection is approximately $H_r^*=-0.227$. Substituting this value into Equation 3, the impedance ratio between the anomaly and the pipe where the generator was located (Class B) is determined as B=0.63. The arrival time (when the pressure starts to drop) of the reflection is $t_a$=0.451 s. As a result, this anomaly is located approximately 219 m downstream of point PB using the sub-sectional wave speed in S5 (970 m/s).

The three possible explanations to the anomaly (deteriorated AC, plastic pipe replacement section or air pocket) are checked in sequence. If the anomaly is a deteriorated AC section, the relative change in wall thickness is determined as $e_{rc}$=−0.723 using Equation 9 or 10. Substituting the determined $e_{rc}$ into Equation 7 and using the determined average effective AC wall thickness of sub-section S5 (15.8 mm) for $e_0$, the effective AC wall thickness for the assumed deteriorated AC short section is determined as $e_{eff}$=4.4 mm, which indicates a reduction of 12.9 mm from the original condition.

Based on engineering judgement, however, a short AC section with such a thin remaining effective AC wall thickness is unlikely to be the real scenario in the field, because pipe sections with such a degree of wall deterioration would have failed even under normal operational condition. As a result, the possibility that this anomaly is a deteriorated AC section is eliminated by the analysis.

The next potential type of localised defect is a plastic pipe replacement. Field workers from the water utility confirmed that polyvinyl chloride (PVC) pipes with a typical sectional length of 4 m were used to replace original AC sections when necessary (eg, to fix a pipe burst). The PVC pipe used for replacement would have a similar cross-sectional area as the original AC pipeline, therefore, the wave speed ratio $a_r$ is the same as the impedance ratio (0.63). Considering that the wave speed of the sub-section S5 is 970 m/s, the wave speed in the anomaly is determined as 611 m/s. The determined wave speed is too high to fit into the typical range of wave speed for PVC water mains, which is typically from 300 to 500 m/s. As a result, the anomaly is unlikely to be a PVC pipe section with a length of 4 in.

The third possibility is that the localised defect is a small air pocket. The section of pipe between point PB and P23 is located in a hilly area with frequent elevation changes. As a result, small air pockets may be trapped at local high elevation points, although several air valves are used along the section. There are some noticeable pressure oscillations after the main reflection R5_B. In particular, after time $t_b$, the pressure rebounds from the lowest point and reaches a level much higher (approximately one third the size of the drop) than the pressure before the main drop (at time $t_0$). After that, a pressure drop much smaller than the main drop is seen and then the pressure recovers to the level before the main drop. The pressure oscillation after the main drop is a feature that has been seen in previous lab experiments on transient response of pipelines with small amount of trapped air. The pressure oscillation after the main reflection as observed in laboratory analysis is believed to be introduced by the oscillation in the volume of the air pocket under the pressure wave.

Summarising the previous analysis, it can be concluded that the anomaly corresponding to reflection R5_B in FIG. 23 (or R5 in FIG. 22) is most likely to be a small trapped air pocket in the pipeline. Other reflections (R1 to R4 and R6) may be analysed by the same procedure with the help of pressure traces measured at other locations. R1, R4 and R6 are induced by pipe class changes, R2 is likely to be a small air pocket and R3 is likely to be a PVC replaced section.

As would be appreciated, this experimental field study adopting the methods of pipeline assessment discussed above has provided an efficient non-invasive and non-destructive condition assessment for asbestos cement (AC) pipelines. Pipe class changes in this experimental study have been successfully identified by the sub-sectional condition assessment. The wave speed, length and effective AC wall thickness of each sub-section have also been determined and are consistent with information given by the design drawings. The sub-sectional analysis also showed that the sub-sections under study have mild wall deterioration that is equivalent to uniform reduction in effective wall thickness of up to 2.3 mm. In addition, a localised defect or anomaly located in the section of interest (between point PB and P23) has been identified and analysed in detail. The analysis showed that the anomaly is most likely to be a small air pocket.

Mild Steel Cement Mortar Lined Pipeline Systems

The Applicant has also conducted a further experimental field trial where the focus was to apply the above methods to assess a cement mortar lined pipe. In this experimental trial, mild steel cement mortar lined (MSCL) pipes are studied in particular, but the analysis may be easily extended to any other types of metallic cement mortar lined pipes or metallic unlined pipes. In this analysis, changes in wall thickness from either side of the pipe wall (internal or external) are considered. As a result, plots may be drawn to describe this relationship for any MSCL pipeline if the specifications of the intact part are known. These plots may then be used as look-up charts for on-site pressure wave based pipeline condition assessment.

Figure 24:
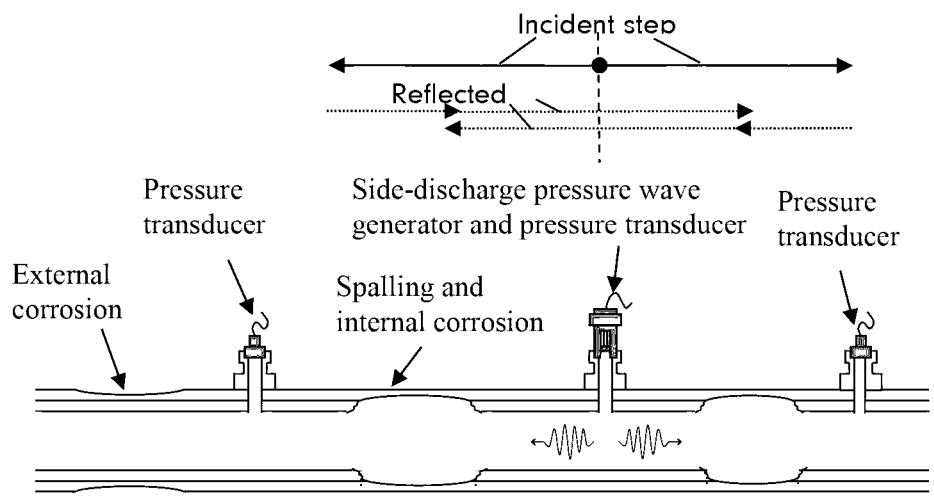
FIG. 24 is an example pipeline system testing configuration for assessing a mild steel cement mortar lined (MSCL) pipeline according to an illustrative embodiment.

Referring now to FIG. 24, there is shown an example pipeline system testing configuration for assessing a mild steel cement lined (MSCL) pipeline according to an illustrative embodiment. In line with the methods described above, a transient pressure wave generator and multiple pressure transducers are employed for each test. The adopted transient generator is a customised side-discharge valve connected to an existing access point (such as an air valve or scour valve). A small step transient pressure wave (typically 5 to 10 m in magnitude) is induced by rapidly closing (within 10 ms) the side-discharge valve after opening and releasing a flow (typically 20 to 40 L/s for pipes from 600 to 1000 mm in diameter) until steady-state conditions are reached.

As depicted in FIG. 24, the generated incident wave then propagates along the pipe in both upstream and downstream directions. As discussed previously, pressure wave reflections occur when the incident wave encounters a localised variation in the pipe, such as a section with a reduction in wall thickness. The reflected pressure waves propagate back towards the generator and are measured by pressure transducers that are mounted along the pipe at measurement locations (also at existing access points). The pressure wave reflections are then able to be analysed to determine the location of localised variations from the arrival times, and the severity of the variations from the magnitude of the reflected wave. By comparing the arrival times of a specific reflection as measured by two or more pressure transducers at different measurement locations, it can be determined whether the reflection comes from the upstream or downstream side of the generator.

Figure 25:
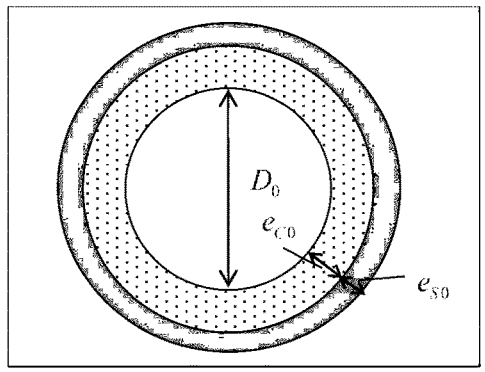
FIG. 25 is a cross sectional view of an intact MSCL pipeline.

Equations 1 to 4 developed above will require adaptation to the scenario of a MSCL pipes. Referring now to FIG. 25, there is shown a cross sectional view of an intact MSCL pipeline ($D_0$ is the internal diameter of the pipe, $e_{C0}$ is the thickness of the cement mortar lining and $e_{S0}$ is the thickness of the steel pipe wall). For pipelines with a cement mortar lining (CML), the contribution of the lining has to be considered when calculating the wave speed.

The cement mortar lining has a different Young's modulus of elasticity to that of steel, but its contribution to the wave speed can be included as an equivalent thickness of steel. The value of the total equivalent steel wall thickness or equivalent steel thickness to be used in the wave speed formula is the summation of the equivalent thickness of steel contributed by the CML and the original thickness of the steel. For a thin-walled intact MSCL pipe, as shown in FIG. 25, the equivalent steel thickness may be defined as $e_0$ and written as:

$$e_0 = e_{C0}\frac{E_C}{E_S} + e_{S0} \qquad \text{Equation 14}$$

where $E_C$ and $E_S$ are the Young's modulus of elasticity of cement mortar lining and steel, respectively, and $e_{C0}$ and $e_{S0}$ are the thicknesses of the CML and that of the steel, respectively.

Assuming the same Poisson's ratio for steel and cement mortar (the Poisson's ratio for the cement mortar may vary depending on the cement mortar to water ratio), the theoretical wave speed for an intact MSCL pipe as shown in FIG. 25 is denoted as $a_0$ and can be written as:

$$a_0^2 = \frac{K/\rho}{1 + (K/E_S)(D_0/e_0)c} \qquad \text{Equation 15}$$

where $D_0$ is the internal diameter of the intact MSCL pipe. Similarly, the wave speed in a section with a change in wall thickness can be written as:

$$a_1^2 = \frac{K/\rho}{1 + (K/E_S)(D_1/e_1)c} \qquad \text{Equation 16}$$

where $a_1$, $D_1$ and $e_1$ are the wave speed, the internal diameter and the equivalent steel thickness, in the section with a change in wall thickness, respectively. As a result, $B_r$ can be re-expressed as:

$$B_r = \frac{a_1 D_0^2}{a_0 D_1^2} \qquad \text{Equation 17}$$

To facilitate the analysis in subsequent sections, the relative change in equivalent steel thickness, $e_{rc}$, is given as:

$$e_{rc} = \frac{e_1 - e_0}{e_0} \qquad \text{Equation 18}$$

As would be appreciated, in this example characterising a pipeline such as determining the remaining wall thickness of a deteriorated section from a measured pressure wave interaction signal may involve a change in wall thickness that occurs either internally or externally or both. Theoretically, there are three possibilities for the cement mortar lining: intact, change in thickness (internally) and total loss. There are also three possibilities for the steel pipe wall: intact, external change in thickness and internal change in thickness. As a result, there are 9 potential combinations for the condition of the pipe wall. In this experimental field trial, internal wall deterioration (only) and external wall deterioration (only) are determined. Simultaneous internal and external wall deterioration is not discussed but is expected to require a superposition of the effects caused by internal wall deterioration (only) and external wall deterioration (only).

Figure 26:
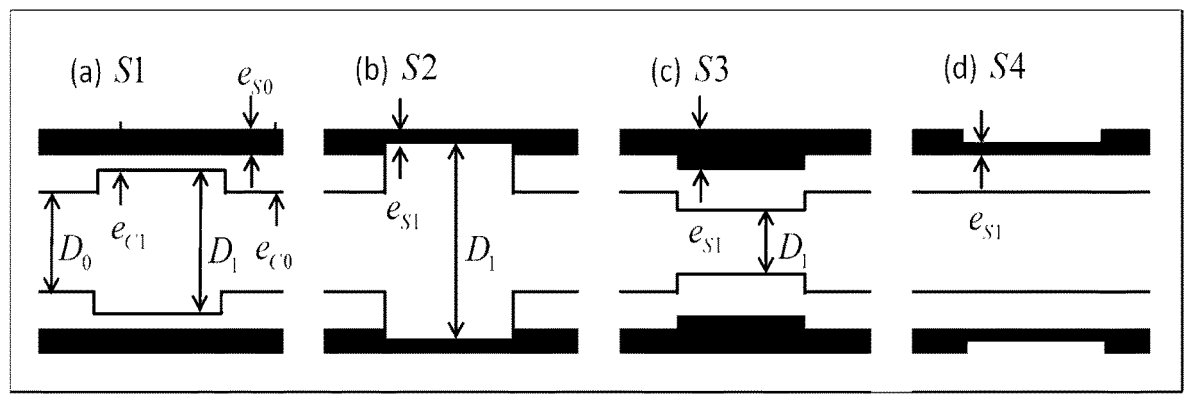
FIGS. 26(a)-(d) are longitudinal views of four sections of MSCL pipeline indicating the different scenarios for changes in wall thickness.

Referring now to FIG. 26, there is shown a longitudinal view of four sections of MSCL pipe with the changes in wall thickness corresponding to commonly-seen wall deterioration cases which are considered in this experimental field study:

26(a) S1: an internal change in the thickness of the CML;
26(b) S2: total loss of the CML plus an internal reduction in the thickness of the steel wall;
25(c) S3: intact CML with an internal change in the thickness of the steel wall; and
26(d) S4: intact CML with an external change in the thickness of the steel wall.

Case S3 exists when the pipeline was initially installed with no lining but lined after years, or a section of original pipe is replaced by a section in the same nominal size (same outside diameter) but a different class (with thicker or thinner steel wall), or sections of a different class are installed during construction.

For the scenario of an internal change in wall thickness, the diameter and wall thickness of the intact and damaged sections can be related based on the fact that the external diameter is constant. If the change is in the thickness of the CML alone [S1, FIG. 26(a)], the following equation holds:

$$D_0 + 2e_{C0} = D_1 + 2e_{C1} \qquad \text{Equation 19}$$

where $e_{C1}$ is the thickness of the CML in the deteriorated/distinct section. In this case, the total equivalent steel thickness is given as:

$$e_1 = e_{C1}\frac{E_C}{E_S} + e_{S0} \qquad \text{Equation 20}$$

Substituting Equations 14 and 18 to Equation 19 yields:

$$D_0 + 2e_0\frac{E_S}{E_C} = D_1 + 2e_1\frac{E_S}{E_C} \qquad \text{Equation 21}$$

Substituting $e_1$ as given in Equation 18 into Equation 21, the ratio $D_1/e_1$ can be written as:

$$\frac{D_1}{e_1} = \frac{D_0}{e_0(1 + e_{rc})} - 2\frac{E_S}{E_C}\frac{e_{rc}}{1 + e_{rc}} \qquad \text{Equation 22}$$

Substituting Equation 22 into Equation 16, and then substituting the ratio $D_0/e_0$ using Equation 15, the wave speed $a_1$ can be described by:

$$a_1^2 = \frac{(K/\rho)(1 + e_{rc})a_0^2}{(K/\rho) + e_{rc}a_0^2(1 - 2cK/E_C)} \qquad \text{Equation 23}$$

Substituting $e_1$ as given in Equation 18 into Equation 22 and rearranging the subsequent equation yields:

$$\frac{D_0}{D_1} = \frac{1}{1 - 2e_{rc}(e_0/D_0)(E_S/E_C)} \quad \text{Equation 24}$$

Substituting Equations 23 and 24 into Equation 17, and replacing $D_0/e_0$ with an expression including $a_0$ as given in Equation 15, the impedance ratio can be described by:

$$B_r = \sqrt{\frac{(K/\rho)(1 + e_{rc})}{(K/\rho) + e_{rc}a_0^2(1 - 2cK/E_C)}} \left[1 - 2e_{rc}\frac{(K/E_C)a_0^2 c}{K/\rho - a_0^2}\right]^{-2} \quad \text{Equation 25}$$

Where finally, substituting Equation 25 into Equation 3, the relationship between the dimensionless head perturbation of the first reflected pressure wave $H_r^*$ and the relative change in equivalent steel thickness $e_{rc}$ for case S1 can be obtained as:

$$H_r^* = \frac{\sqrt{\frac{(K/\rho)(1 + e_{rc})}{(K/\rho) + e_{rc}a_0^2(1 - 2cK/E_C)}} - \left[1 - 2e_{rc}\frac{(K/E_C)a_0^2 c}{K/\rho - a_0^2}\right]^2}{\sqrt{\frac{(K/\rho)(1 + e_{rc})}{(K/\rho) + e_{rc}a_0^2(1 - 2cK/E_C)}} + \left[1 - 2e_{rc}\frac{(K/E_C)a_0^2 c}{K/\rho - a_0^2}\right]^2} \quad \text{Equation 26}$$

It can be seen from Equation 26 that the dimensionless head perturbation $H_r^*$ is related to the relative change in the equivalent steel thickness $e_{rc}$, the wave speed in the intact pipeline $a_0$, and physical properties of the pipeline and fluid that are typically known (K and $\rho$). The value of $a_0$ can be calculated using the theoretical formula in Equation 15, or measured by conducting experiments. As a result, when conducting pipeline condition assessment, the value of $e_{rc}$ may be determined from the value of $H_r^*$, which in turn can be determined from a measured pressure wave interaction signal. A curve describing values of $H_r^*$ corresponding to values of $e_{rc}$ can be plotted numerically.

Equation 26 is for an internal change in the thickness of the CML. A negative value of $e_{rc}$ represents a thinning in CML, which can be induced by deterioration. A positive value of $e_{rc}$ is also considered, which represents a section of pipe with a CML thickness greater than the standard thickness. The lower bound of $e_{rc}$ is reached when the CML is totally lost and is calculated as $e_{S0}/e_0 - 1$.

For case S2 in FIG. 26(b), the relationship between $H_r^*$ and $e_{rc}$ may be determined by a similar procedure as used in the derivation of Equations 19 to 26. The expression of $H_r^*$ for the S2 case is given by:

$$H_r^* = \frac{\sqrt{\frac{(K/\rho)(1 + e_{rc})}{K/\rho + e_{rc}a_0^2 - 2ca_0^2 K(1/E_C - 1/E_S)(e_{S0}/e_0 - 1)}} - \left\{1 - 2\frac{(K/E_S)a_0^2 c}{K/\rho - a_0^2}\left[e_{rc} + \left(\frac{E_S}{E_C} - 1\right)\left(\frac{e_{S0}}{e_0} - 1\right)\right]\right\}^2}{\sqrt{\frac{(K/\rho)(1 + e_{rc})}{K/\rho + e_{rc}a_0^2 - 2ca_0^2 K(1/E_C - 1/E_S)(e_{S0}/e_0 - 1)}} + \left\{1 - 2\frac{(K/E_S)a_0^2 c}{K/\rho - a_0^2}\left[e_{rc} + \left(\frac{E_S}{E_C} - 1\right)\left(\frac{e_{S0}}{e_0} - 1\right)\right]\right\}^2} \quad \text{Equation 27}$$

Note that the value of $2cK/E_S$ is in the order of $10^{-2}$ so that an approximation $1 - 2cK/E_S \approx 1$ is used in the derivation of Equation 27. The possible range of $e_{rc}$ is from $-1$ to $e_{S0}/e_0 - 1$. The lower bound corresponds to total loss of the CML plus total reduction of the steel wall, and the upper bound refers to total loss of the CML, but no reduction in the steel thickness.

By combining Equations 26 and 27, a curve may be plotted for any specific MSCL pipe to describe the relationship between $H_r^*$ and $e_{rc}$ for cases S1 and S2 together. A discontinuity is expected in the curve, which represents the situation of total loss of the CML, but no loss of the steel wall thickness.

Case S3, ie, intact CML with an internal change in the thickness of the steel wall, may be analysed by the same strategy as used for cases S1 and S2. Analysis shows that case S3 is equivalent to the scenario of an internal change in wall thickness in an unlined pipe. Using the approximation of $1 - 2cK/E_S \approx 1$, the relationship between $H_r^*$ and $e_{rc}$ in this case is given by:

$$H_r^* = \frac{\sqrt{\frac{(K/\rho)(1 + e_{rc})}{(K/\rho) + e_{rc}a_0^2}} - \left[1 - 2e_{rc}\frac{(K/E)a_0^2 c}{K/\rho - a_0^2}\right]^2}{\sqrt{\frac{(K/\rho)(1 + e_{rc})}{K/\rho + e_{rc}a_0^2}} + \left[1 - 2e_{rc}\frac{(K/E)a_0^2 c}{K/\rho - a_0^2}\right]^2} \quad \text{Equation 28}$$

For case S4, as shown in FIG. 26 (d), ie, intact CML with an external change in the thickness of the steel wall, such as a pipe section with a reduction in wall thickness due to extended external corrosion. The equivalent steel thickness for case S4 can be written as:

$$e_1 = e_{C0}\frac{E_C}{E_S} + e_{S1} \quad \text{Equation 29}$$

The intact pipe and the section with an external change in wall thickness have the same internal diameter $D_0$. As a result, in this case, $D_0$ can be used in the formula for $a_1$ (Equation 16) and $B_r$ is the ratio of the wave speeds, i.e. $B_r = a_1/a_0$. Using Equations 15, 16, 18 and 29, the impedance ratio can then be derived as:

$$B_r = \sqrt{\frac{(K/\rho)(1+e_{rc})}{(K/\rho)+e_{rc}a_0^2}}$$ Equation 30

Substituting Equation 30 into Equation 3 results in:

$$H_r^* = \frac{\sqrt{(K/\rho)(1+e_{rc})} - \sqrt{(K/\rho)+e_{rc}a_0^2}}{\sqrt{(K/\rho)(1+e_{rc})} + \sqrt{(K/\rho)+e_{rc}a_0^2}}$$ Equation 31

In Equation 31, the lower bound of $e_{rc}$ is $-e_{S0}/e_0$, which represents the total loss of the steel wall. A curve can be drawn for a specific MSCL pipeline for Equation 31, which can then serve as a look-up chart for pipeline condition assessment.

Numerical simulations using the Method of Characteristics (MOC) were conducted to verify the validity of Equations 26, 27, 28 and 31. A reservoir-pipeline-valve (RPV) pipeline system was modelled and a step transient pressure wave was used as the excitation. The physical details of the pipeline are those for the existing MSCL Morgan Transmission Pipeline (MTP) in South Australia where the subsequent experimental trial was carried out.

For intact sections, the external diameter is 762 mm, the internal diameter ($D_0$) is 727.5 mm, the thickness of the CML ($e_{C0}$) is 12.5 mm and the thickness of the steel ($e_{S0}$) is 4.76 mm. Other parameters used in the simulations include: the estimated elastic Young's modulus of the cement mortar $E_C$=25 GPa; the elastic Young's modulus of the steel pipe wall $E_S$=210 GPa; the bulk modulus of water (at 15° C.) K=2.14 GPa; the density of water (at 15° C.) $\rho$=999.1 kg/m$^3$ and the restraint factor for an axially and laterally restrained steel pipe c=0.91 (for a Poisson's ratio for the steel pipe wall of 0.3). As a result, the theoretical wave speed and equivalent steel thickness for an intact section are calculated as $a_0$=1015 m/s and $e_0$=6.25 mm, respectively.

Figure 27:
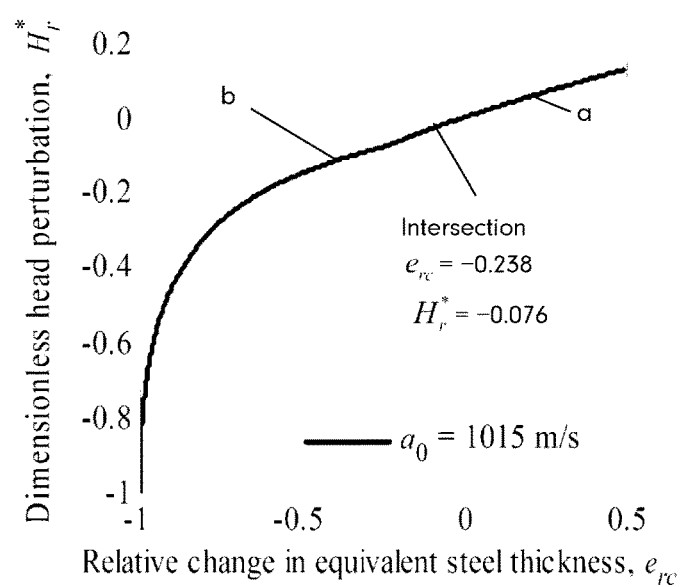
FIG. 27 is a plot of the dimensionless head perturbation as a function of the relative change in equivalent steel thickness for the pipeline sections S1 and S2 illustrated in FIGS. 26(a) and (b)

Referring now to FIG. 27, there is shown a plot of the relationship between the dimensionless head perturbation ($H_r^*$) and the relative change in equivalent steel thickness ($e_{rc}$) for: (a) an internal change in the thickness of the CML [Equation 26, S1 in FIG. 26(a)], and (b) total loss of the CML plus a reduction in the thickness of the steel wall [Equation 27, S2 in FIG. 26(b)].

Figure 28:
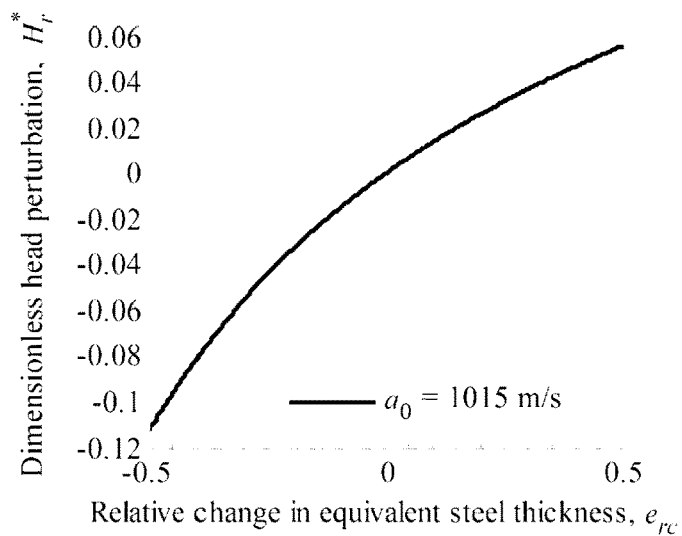
FIG. 28 is a plot of the dimensionless head perturbation as a function of the relative change in equivalent steel thickness for the pipeline section S3 illustrated in FIG. 26(c)

Referring now to FIG. 28, there is shown a plot of the relationship between the dimensionless head perturbation ($H_r^*$) and the relative change in equivalent steel thickness ($e_{rc}$) for the case of intact CML with an internal change in the thickness of the steel wall [Equation 28, S3 in FIG. 26(c)].

Figure 29:
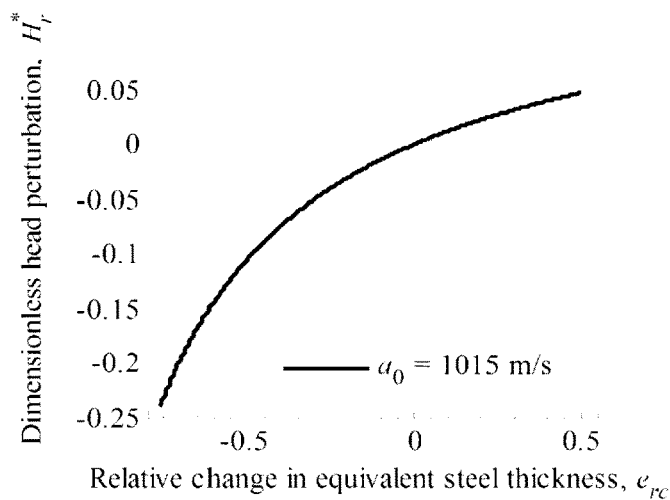
FIG. 29 is a plot of the dimensionless head perturbation as a function of the relative change in equivalent steel thickness for the pipeline section S4 illustrated in FIG. 26(d)

Referring now to FIG. 29, there is shown a plot of the relationship between the dimensionless head perturbation ($H_r^*$) and the relative change in equivalent steel thickness ($e_{rc}$) for an external change in the thickness of the steel wall [Equation 31 S4 in FIG. 26(d)].

As referred to above, curves of Equations 26 and 27 are shown together in FIG. 27. The point at $e_{rc}$=$e_{S0}$)/$e_0$-1=-0.238 and $H_r^*$=-0.076 is the intersection of the curves of Equations 26 and 27 and it corresponds to total CML loss with an intact steel wall. Plots for Equations 28 and 31 are given in FIG. 28 and FIG. 29. The lower bound for the curve in FIG. 6 is $e_{rc}$=-$e_{S0}$/$e_0$=-0.762. As would be appreciated, FIGS. 27 to 29 may be used as look-up charts for pipeline condition assessment for the MTP.

The four cases, S1 to S4 as shown in FIG. 26, are simulated by MOC in sequence and independently (ie, in each simulation, only one case was involved). Specifically, the sections of pipe involved in the simulations include: (a) S1: $e_{C1}$=6 mm; (b) S2: $e_{S1}$=3 mm; (c) S3: $e_{S1}$=6.35 mm; and (d) S4: $e_{S1}$=3 mm. A RPV system was used and the total length of the pipeline was taken as 2333 m. The length of each section with a change in wall thickness was approximately 100 m (with slight adjustment to keep the Courant number value to unity) and started from 1015 m downstream of the reservoir. The time step used in the MOC was 0.0005 s. A step transient wave was generated by closing the downstream valve within one time step. Friction was not considered in the MOC simulations. Pressure wave interaction signals were measured at a point 203 m downstream from the deteriorated section.

The theoretical wave speeds in the four sections (S1 to S4) were calculated using the wave speed formula with the results: $a_{1\_S1}$=975 m/s, $a_{1\_S2}$=801 m/s, $aa_{1\_S3}$=1074 m/s, and $a_{1\_S4}$=925 m/s. The theoretical equivalent steel thicknesses for the four sections (S1 to S4) were calculated as $e_{1\_S1}$=5.47 mm, $e_{1\_S2}$=3.0 mm, $e_{1\_S3}$=7.84 mm, $e_{1\_S4}$=4.49 mm. The theoretical relative changes in the equivalent steel thicknesses are calculated as $e_{rc\_S1}$=-0.124, $e_{rc\_S2}$=-0.520, $e_{rc\_S3}$=0.254, $e_{rc\_S4}$=-0.282.

Figure 30:
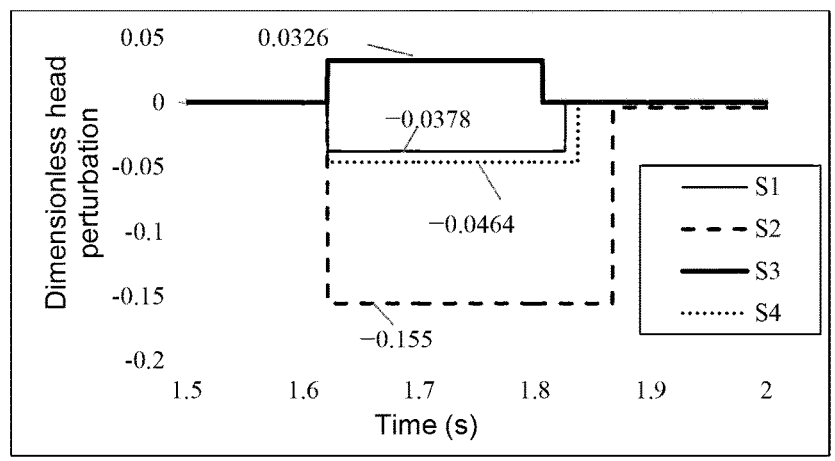
FIG. 30 is a plot of the calculated dimensionless head perturbations for pipeline sections S1 to S4 illustrated in FIG. 26.

Referring now to FIG. 30, there is shown the calculated dimensionless head perturbations ($H_r^*$) obtained from the MOC simulations for the four cases (S1 to S4).

Using FIGS. 27 to 29, the corresponding values for the relative change in the equivalent steel thickness can be determined for each case, and the results are $e_{rc\_S1}^{MOC}$=-0.123 $e_{rc\_S2}^{MOC}$=-0.519 $e_{rc\_S3}^{MOC}$=0.258, $e_{rc\_S4}^{MOC}$=-0.283. It can be seen that the results determined from the numerical transient pressure traces are consistent to a high degree with the analytical results ($e_{rc\_S1}$ to $e_{rc\_S4}$). The small differences are from rounding errors and the approximations used in the derivation of Equations 26, 27, 28 and 31. The numerical simulations verify that Equations 26, 27, 28 and 31 are valid and they may be used for quantitative pipeline condition assessment. For a specific measured wave reflection, potential deterioration scenarios may be listed and the remaining wall thickness for each scenario can be determined.

Figure 31:
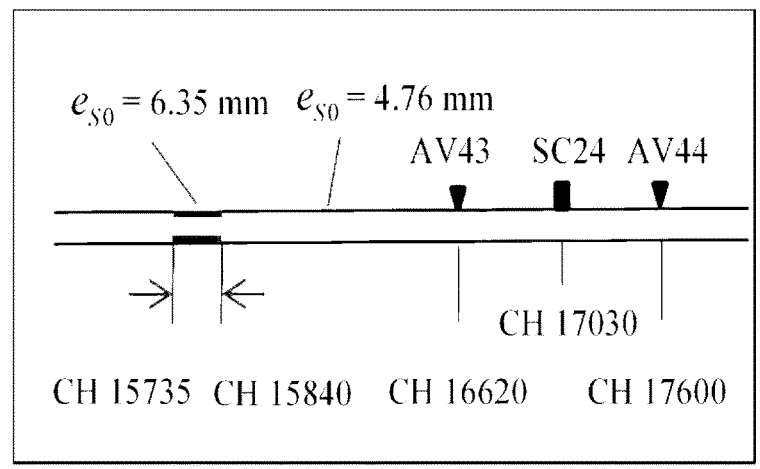
FIG. 31 is an example pipeline system testing configuration of an MSCL pipeline located in Morgan, South Australia (ie, the Morgan transmission pipeline)

Referring now to FIG. 31, there is shown a layout of a section of the Morgan transmission pipeline (MTP) where the experimental field study was conducted. The relevant section of the pipeline studied was from chainage (location as measured along the pipe length from some datum) 15000 m to CH 18000 m, covering scour valve No. 24 (SV24), and air valves No. 43 (AV43) and No. 44 (AV44).

The MTP is an above ground MSCL water main between a pump station and a downstream end staging tank over a length of 26.1 km. During the field testing, the pump was turned off and formed a dead-end boundary. The pipeline system was pressurised by the staging tank. The physical details for intact pipe sections ($D_0$, $e_{C0}$, $e_{S0}$, $e_0$ and $a_0$) and other parameters ($E_C$, $E_S$, K, $\rho$ and c) have been given above. The section between CH 15735 m and CH 15840 m has a known thicker steel thickness of 6.35 mm. However, the external diameter and the thickness of the CML in this section are the same as counterparts in the original intact sections (Case S3). A few replacement pipe sections with thicker steel wall are also located in this length of pipe. These replacement sections are not considered here because of their short length (typically a few meters).

A pressure wave generator, in the form of a customised side-discharge valve, was used at SC24 to produce step transient pressure waves. Flow meters were connected to the side-discharge valve to measure the steady-state side-discharge before the signal generation. The steady-state side-discharge is used to facilitate the determination of the magnitude of the incident step wave. Pressure transducers were placed at measurement locations SC24, AV43 and AV44 to measure the pressure response.

Figure 32:
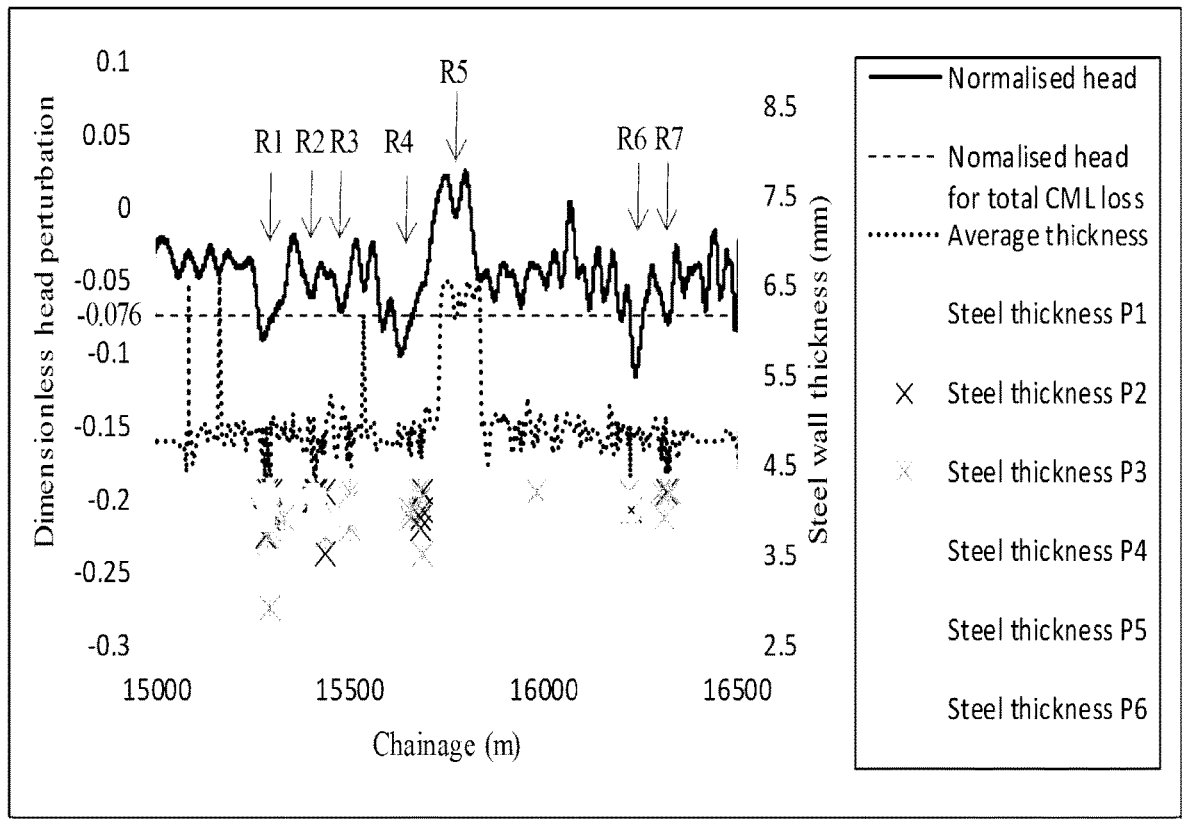
FIG. 32 is a plot of the pressure wave interaction signal measured at measurement location AV43 indicated on FIG. 31 and indicating pressure wave reflections R1 to R7.

Referring now to FIG. 32, there is shown a plot of the pressure wave interaction signal or dimensionless head perturbation (as a function of distance) between chainage 15000 m and 16500 m as measured at AV43 (the solid line). Also plotted is the normalised dimensionless head perturbation resulting from a section of pipe with total CML loss but intact steel wall (the dashed line), the average steel thickness measured by ultrasonic sounding (the dotted line) and ultrasonic measurements with values less than 4.3 mm (marked as indicated in the legend).

Long-period (low frequency) pressure oscillations associated with the opening of the side-discharge valve (to introduce a side-discharge) have been removed by a band-pass filter. The steady-state head is determined by averaging a short period of the data measured before the arrival of the incident wave, and the result is $H_0=32.01$ m. The magnitude of the incident wave ($H_i-H_0$) is estimated from the wave front shown in the measured trace (the range from the steady state head $H_0$ to the first peak shown on the top of the wave front, which is 37.80 m), and the result is 5.79 m.

The x-axis in FIG. 32 is the chainage corresponding to the pressure wave reflections. The chainage information is obtained by TDR and using the measured arrival time of the reflection and the representative wave speeds. The arrival time of a reflection as measured by a transducer (relative to the arrival time of the wave front) is the time for a pressure wave to travel to, and be reflected back from, the corresponding defect. The representative wave speed for the section between AV43 (CH16620) and the right boundary of the thicker-walled section (CH 15840) is 930 m/s, which is determined by the known distance and the arrival time of the reflection resulting from the thicker-walled section. The representative wave speeds for the thicker-walled section and the pipe section on its left side are calculated as 1050 m/s and 900 m/s respectively.

The dashed line in FIG. 32 represents the value of the dimensionless head perturbation resulting from a section of pipe with total CML loss but intact steel wall, which is $H_r^*=-0.076$. This dashed line acts as a threshold to distinguish significant reflections that result from deteriorated sections with total CML loss and internal corrosion. The steel wall thickness values were also measured by an ultrasonic thickness measurement instrument at 5 m intervals along the MTP between CH 14900 and CH 18900. The ultrasonic measurements were taken at eight points around the circumference of the pipe (P1 to P8, starting from the top of the pipe and with 45° interval around the circumference) at each location. The interval of measurement was reduced to 1 m for some sections where changes in steel wall thickness were detected.

The dashed line in FIG. 32 gives the average steel wall thickness along the section of pipe (average of the ultrasonic wall thicknesses measurements at eight points around the circumference). The markers shown in FIG. 32 are ultrasonic measurements of the steel wall thickness with values less than 4.3 mm (this value is considered significant as it corresponds to approximately a 10% steel wall reduction compared to the original steel thickness of 4.76 mm as given by the manufacturer for an intact MSCL section).

Seven major reflections are selected for analysis, shown as R1 to R7 in FIG. 32. The selection is based on a comprehensive analysis of the pressure wave interaction signals measured at AV43, SC24 and AV44 in the same test to ensure the selected reflections are induced by defects that are located on the left hand side of AV43 (see FIG. 31) adopting the time shifting methods described above.

The reflection R5 is from a known feature, the thicker-walled section between CH 15735 m and CH 15840 m, and it aligns with Case S3 as in FIG. 26(c). The maximum dimensionless head perturbation for R5 is read as 0.0254 from FIG. 32. Using the look-up chart given in FIG. 28, the relative change in equivalent steel thickness is determined as 0.195. Using Equation 18 and $e_0=6.25$ mm for the MTP, the equivalent steel thickness for this thicker-walled section is determined as $e_1^{R5}=7.47$ mm. Using Equation 14 and $e_{C0}=12.5$ mm for the MTP, the thickness of the steel wall for the thicker-walled section is determined as $4=5.98$ mm. This result is smaller than the steel wall thickness given by the manufacturer for this section (which was 6.35 mm) and the ultrasonic measurement (6.1 to 6.5 mm). The discrepancy is believed to be caused by the inaccuracy of the estimated magnitude of the dimensionless head perturbation for R5 and the damping of the transient pressure wave.

The MTP is an above ground pipe and no significant external wall deterioration was observed during the testing for the pipe section under study. As a result, the reflections R1 to R4, R6 and R7 are believed to be associated with pipe sections with internal changes in wall thicknesses. In real MSCL pipelines, the internal wall deterioration is more complex than the situation discussed in the numerical study [Cases S1 and S2 as shown in FIGS. 26(a) and (b)]. The deterioration of CML mainly includes cracking, de-bonding, and spalling, and the distribution of deterioration is not uniform around the internal circumference. This has been confirmed by the CCTV camera footage obtained for the MTP.

After spalling of the CML, internal corrosion may start on the steel wall. The sizes of the dimensionless reflections are compared with the threshold that represents uniform total CML loss (dashed line in FIG. 32). Reflections R1, R4, R6 and R7 are greater than the threshold so as a result they are believed to be indications of large scale CML loss together with considerable internal corrosion of the steel wall. Reflections R2 and R3 are significant but haven't reached the threshold so they are likely to be indications of considerable de-bonding and spalling of the CML associated with localised internal corrosion.

To quantify the deterioration, the look-up chart in FIG. 27 is used to determine the representative wall thickness (the remaining wall thickness under uniform wall deterioration assumption). Sections associated with reflections R1, R4, R6 and R7 are equivalent to sections with total CML loss and uniform thinning of the steel wall (Case S2), in which the representative remaining steel wall thicknesses are determined as $e_{S1}^{R1}=4.34$ mm, $e_{S1}^{R4}=4.05$ mm, $e_{S1}^{R6}=3.76$ mm and $e_{S1}^{R7}=4.62$ mm, respectively.

Note that the results are only the representative steel wall thicknesses (based on the assumption of 'uniform deterioration') and the thicknesses in some patches can be smaller than the representative values. Because the damping of the pressure wave (which reduces the magnitude of pressure wave reflections) is approximately proportional to the distance travelled by the wave, and the reflections R1 to R4 are resulting from sections more than 1 km away from the measurement location (AV43), the condition of these sections is likely to be worse than the representative conditions as determined by using the observed magnitudes of the reflections.

Overall, the condition of the pipe, as determined by applying the proposed technique, is generally consistent with the ultrasonic results of the steel wall thickness. Six pipe sections with internal wall deterioration are identified by using the dimensionless head perturbation trace and the representative steel wall thicknesses are determined by the look-up charts.

As would be appreciated, the methods and systems described above represent a significant advance in assessing the condition of a pipeline and in particular to determining the location of localised variations in the pipeline with respect to any generation location. Once these locations have been determined further analysis may be carried out such as sub-sectional analysis to determine the characteristics of sub-sections of the pipeline on sectional basis and/or the identification of localised defects in the pipeline.

Throughout the specification the term "pipeline system" is taken to mean the pipeline and associated connected hydraulic components and features. Hydraulic components include, but are not limited to, various types of valves such as inline valves (partially or fully closed), scour valves, valves on entry to branch pipeline (partially or fully closed) and air valves; closed and open branch pipeline sections extending from the pipeline; off-takes; reservoirs; and tanks (eg, surge tanks or air vessels or chambers). Hydraulic features include, but are not limited to, changes in pipeline material, lining, wall thickness, diameter or class.

As would also be apparent, a reference in this specification to assessing, or assessment of the "condition" of a pipeline includes determining not only the presence and extent of defects in the pipeline, but also to determining the configuration or topology of the pipeline system as defined by the presence and location of the various hydraulic components and features associated with the pipeline both registered and unregistered.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. As would be appreciated, the described functionality maybe in varying ways for each particular application, but such implementation decisions should not be interpreted as causing a departure from the scope of the present disclosure.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for assessing the condition of a pipeline in a pipeline system, comprising:
    generating a pressure wave in the fluid being carried along the pipeline system at a generation location along the pipeline system;
    detecting a first pressure wave reflection signal at a first measurement location along the pipeline system resulting from a reflection of the pressure wave from localised variations in the pipeline;
    detecting synchronously a second pressure wave reflection signal at a second measurement location along the pipeline system resulting from the reflection of the pressure wave from localised variations in the pipeline;
    comparing the first and second pressure wave reflection signals to determine a location of individual features in the first and second pressure wave reflection signals with respect to the generation location, the individual features corresponding to pressure wave reflections from localised variations in the pipeline, wherein comparing the first and second pressure wave reflection signals comprises comparing by time-shifting the first and/or second pressure wave reflection signals to determine the location of individual features including determining which side of the generation location the localised variations are located; and
    characterising the individual features to assess the condition of the pipeline.

2. The method as claimed in claim 1, wherein determining which side of the generation location the localised variations are located comprises:
    selecting a measurement location to be a reference measurement location, the reference measurement location not located at the generation location;
    for each remaining measurement location determining whether each remaining measurement location is located:
        on the same side of the generation location as the reference measurement location;
        on the opposite side of the generation location compared to the reference measurement location; or
        at the generation location;
    applying a negative time shift (backward in time) to the respective pressure wave reflection signal for those measurement locations located on the same side of the generation location as the reference measurement location, the negative time shift corresponding to the time interval that the pressure wave takes to travel from the generation location to the respective measurement location;
    applying a positive time shift (forward in time) to the respective pressure wave reflection signal for those measurement locations located on the other side of the generation location compared to the reference measurement location, the positive shift corresponding to the time interval that the pressure wave takes to travel from the generation location to the respective oppositely located measurement location;

applying no time shift to the respective pressure wave reflection signal for those measurement locations located at the generation location; and identifying common features in the time shifted pressure wave reflection signals, the common features corresponding to a subset of localised variations located on the other side of the generation location compared to the reference measurement location.

3. The method as claimed in claim 2, further comprising:

applying a positive time shift to the respective pressure wave reflection signal for those measurement locations located on the same side of the generation location as the reference measurement location, the positive time shift corresponding to the time interval that the pressure wave takes to travel from the generation location to the respective measurement location;

applying a negative time shift to the respective pressure wave reflection signal for those measurement locations located on the other side of the generation location compared to the reference measurement location, the negative shift corresponding to the time interval that the pressure wave takes to travel from the generation location to the respective oppositely located measurement location;

applying no time shift to the respective pressure wave reflection signal for those measurement locations located at the generation location; and identifying common features in the time shifted pressure wave reflection signals, the common features corresponding to a subset of localised variations located on the same side of the generation location compared to the reference measurement location.

4. The method as claimed in claim 2, further comprising changing the reference measurement location to a measurement location located on the other side of the generation location.

5. The method as claimed in claim 2, wherein the reference measurement location corresponds to a hypothetical measurement location.

6. The method as claimed in claim 1, wherein characterising the individual features to assess the condition of the pipeline comprises applying threshold criteria to an individual feature in the first and second pressure wave reflection signals corresponding to a pressure wave reflection from a localised variation in the pipeline to determine whether the localised variation is a hydraulic feature and/or component of the pipeline system.

7. The method as claimed in claim 6, wherein determining whether the localised variation is a hydraulic feature and/or component of the pipeline system comprises classifying the pressure wave reflection as corresponding to a type of hydraulic feature and/or component.

8. The method as claimed in claim 7, wherein the type of hydraulic feature comprises one or more of:
a change in pipe material;
a change in pipe diameter;
a change in pipe lining;
a change in pipe wall thickness; or
a change in pipe class.

9. The method as claimed in claim 7, wherein the type of hydraulic component comprises one or more of:
a valve;
a closed or open branch pipeline section extending from the pipeline;
an off-take;
a reservoir; or
a tank.

10. The method as claimed in claim 9, wherein the valve type of hydraulic component comprises one or more of the following valve sub-types of:
a partially or fully closed inline valve;
a scour valve;
a partially or fully closed valve on entry to a branch pipeline; or
an air valve.

11. The method as claimed in claim 6, wherein determining whether the localised variation is a hydraulic feature and/or component of the pipeline system comprises correlating the localised variation with prior information regarding the pipeline system to determine whether the hydraulic feature and/or component is registered or unregistered.

12. The method as claimed in claim 1, wherein characterising the individual features to assess the condition of the pipeline comprises applying threshold criteria to identify major pressure wave reflections in the first and second pressure wave reflection signals.

13. The method as claimed in claim 12, comprising dividing the pipeline into sub-sections based on the locations of the localised variations responsible for the major pressure wave reflections.

14. The method as claimed in claim 13, comprising determining a characteristic of each sub-section.

15. The method as claimed in claim 14, wherein the characteristic is the wave speed for each sub-section.

16. The method as claimed in claim 14, wherein the characteristic is the impedance for each sub-section.

17. The method as claimed in claim 14, wherein the characteristic is the location and extent of each sub-section.

18. The method as claimed in claim 14, wherein the characteristic is the equivalent wall thickness of each sub-section.

19. The method as claimed in claim 1, wherein characterising the individual features to assess the condition of the pipeline comprises applying threshold criteria to identify significant pressure wave reflections in the first and second pressure wave reflection signals corresponding to localised defects in the pipeline.

20. The method as claimed in claim 19, comprising classifying the significant pressure wave reflection as corresponding to a type of localised defect.

21. The method as claimed in claim 20, wherein the type of localised defect comprises one or more of:
a short reach in the pipeline with significant wall deterioration;
a leak;
a blockage; or
an air pocket.

22. The method as claimed in claim 20, comprising determining the location of the localised defect in the pipeline.

23. A system for assessing the condition of a pipeline in a pipeline system, comprising:
a pressure wave generator for generating a pressure wave in the fluid being carried along the pipeline system at a generation location along the pipeline system;
a first pressure detector for detecting a first pressure wave reflection signal at a first measurement location along the pipeline system resulting from a reflection of the pressure wave from localised variations in the pipeline;
a second pressure detector for detecting synchronously a second pressure wave reflection signal at a second measurement location along the pipeline system resulting from the reflection of the pressure wave from localised variations in the pipeline; and a data processor for:
  comparing the first and second pressure wave reflection signals to determine a location of individual features in the first and second pressure wave reflection signals with respect to the generation location, the individual features corresponding to pressure wave reflections from localised variations in the pipeline, wherein comparing the first and second pressure wave reflection signals comprises comparing by time-shifting the first and/or second pressure wave reflection signals to determine the location of individual features including determining which side of the generation location in the pipeline the localised variations are located; and
  characterising the individual features to assess the condition of the pipeline.

24. A method for assessing the condition of a section of pipeline in a pipeline system, the method comprising:
  generating a first pressure wave in the fluid being carried along the pipeline system, the first pressure wave generated at a location upstream or downstream of the section of pipeline;
  detecting a first pressure wave response signal at a first set of one or more measurement locations along the pipeline system;
  generating a second pressure wave in the fluid carried along the pipeline system, the second pressure wave generated at a location downstream of the section of pipeline if the first pressure wave was generated upstream or alternatively at a location upstream of the section of pipeline if the first pressure wave was generated downstream;
  detecting a second pressure wave response signal at a second set of one or more measurement locations along the pipeline;
  comparing by time-shifting the first and second pressure wave response signals measured at the first and second set of measurement locations to identify the source locations and directions of pressure wave reflections measured in the first and second pressure wave response signals;
  dividing the section of pipeline into a two or more sub-sections according to a selection of the source locations of the pressure wave reflections; and
  assessing the condition of each sub-section of the section of pipeline based on a localised characterisation of each sub-section of the section of pipeline.

* * * * *